United States Patent
Suthar et al.

(10) Patent No.: US 10,742,396 B2
(45) Date of Patent: *Aug. 11, 2020

(54) SECURING COMMUNICATIONS FOR ROAMING USER EQUIPMENT (UE) USING A NATIVE BLOCKCHAIN PLATFORM

(71) Applicant: Cisco Technology, Inc., San Jose, CA (US)

(72) Inventors: Om Prakash Suthar, Bolingbrook, IL (US); Ammar Rayes, San Ramon, CA (US); Michael David Geller, Weston, FL (US); Ian McDowell Campbell, Littleton, CO (US); Aeneas Sean Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,884

(22) Filed: May 17, 2019

(65) Prior Publication Data
US 2019/0380031 A1 Dec. 12, 2019

Related U.S. Application Data

(63) Continuation of application No. 16/171,190, filed on Oct. 25, 2018, now Pat. No. 10,299,128.
(Continued)

(51) Int. Cl.
*H04L 9/06* (2006.01)
*H04W 12/06* (2009.01)
(Continued)

(52) U.S. Cl.
CPC ........ *H04L 9/0637* (2013.01); *G06F 9/45558* (2013.01); *G06Q 20/065* (2013.01);
(Continued)

(58) Field of Classification Search
CPC ........ H04L 63/08; H04L 63/10; H04W 12/06; H04W 12/08; H04W 60/00; H04W 60/02; G06Q 20/40; G06Q 20/325
(Continued)

(56) References Cited

U.S. PATENT DOCUMENTS

| 4,236,068 A | 11/1980 | Walton |
| 5,642,303 A | 6/1997 | Small et al. |

(Continued)

FOREIGN PATENT DOCUMENTS

| WO | WO 2013/020126 | 2/2013 |
| WO | WO 2014/098556 | 6/2014 |

(Continued)

OTHER PUBLICATIONS

Alexopoulos, Nikolaos, et al. "Beyond the hype: On using blockchains in trust management for authentication." 2017 IEEE Trustcom/BigDataSE/ICESS. IEEE, 2017 (Year: 2017).*

(Continued)

*Primary Examiner* — Syed A Zaidi
(74) *Attorney, Agent, or Firm* — Polsinelli PC

(57) ABSTRACT

A network function (NF) entity in a communication network receives authentication data associated with a User Equipment (UE), determines the UE supports a blockchain registration procedure based on the authentication data, exchanges authentication messages with a Blockchain Roaming Broker (BRB) entity over a blockchain network interface, receives a blockchain authentication confirmation from the BRB entity, and registers the UE with the core network based on the blockchain authentication confirmation.

18 Claims, 10 Drawing Sheets

Related U.S. Application Data

(60) Provisional application No. 62/682,778, filed on Jun. 8, 2018.

(51) Int. Cl.

| | | |
|---|---|---|
| *H04W 12/08* | (2009.01) | |
| *H04L 29/06* | (2006.01) | |
| *G06Q 20/40* | (2012.01) | |
| *G06Q 20/32* | (2012.01) | |
| *H04W 60/00* | (2009.01) | |
| *G06Q 20/36* | (2012.01) | |
| *G06Q 20/10* | (2012.01) | |
| *G06Q 20/38* | (2012.01) | |
| *G06Q 20/06* | (2012.01) | |
| *H04L 9/32* | (2006.01) | |
| *G06F 9/455* | (2018.01) | |
| *H04L 9/08* | (2006.01) | |
| *H04L 9/30* | (2006.01) | |
| *H04L 12/911* | (2013.01) | |
| *H04W 8/02* | (2009.01) | |
| *H04W 88/02* | (2009.01) | |
| *H04W 8/18* | (2009.01) | |
| *H04W 60/04* | (2009.01) | |

(52) U.S. Cl.
CPC ........... *G06Q 20/10* (2013.01); *G06Q 20/322* (2013.01); *G06Q 20/325* (2013.01); *G06Q 20/36* (2013.01); *G06Q 20/389* (2013.01); *G06Q 20/40* (2013.01); *G06Q 20/401* (2013.01); *G06Q 20/403* (2013.01); *H04L 9/083* (2013.01); *H04L 9/30* (2013.01); *H04L 9/321* (2013.01); *H04L 9/3236* (2013.01); *H04L 9/3257* (2013.01); *H04L 9/3297* (2013.01); *H04L 47/70* (2013.01); *H04L 63/08* (2013.01); *H04L 63/10* (2013.01); *H04W 8/02* (2013.01); *H04W 12/06* (2013.01); *H04W 12/08* (2013.01); *H04W 60/00* (2013.01); *G06F 2009/4557* (2013.01); *G06F 2009/45595* (2013.01); *G06Q 2220/00* (2013.01); *H04L 2209/38* (2013.01); *H04W 8/18* (2013.01); *H04W 60/04* (2013.01); *H04W 88/02* (2013.01)

(58) Field of Classification Search
USPC .......................................................... 726/4
See application file for complete search history.

(56) References Cited

U.S. PATENT DOCUMENTS

| | | | |
|---|---|---|---|
| 5,751,223 A | | 5/1998 | Turner |
| 6,812,824 B1 | | 11/2004 | Goldinger et al. |
| D552,603 S | | 10/2007 | Tierney |
| 7,573,862 B2 | | 8/2009 | Chambers et al. |
| D637,569 S | | 5/2011 | Desai et al. |
| 7,975,262 B2 | | 7/2011 | Cozmei |
| 8,010,079 B2 | | 8/2011 | Mia et al. |
| 8,102,814 B2 | | 1/2012 | Rahman et al. |
| 8,260,320 B2 | | 9/2012 | Herz |
| 8,284,748 B2 | | 10/2012 | Borghei |
| 8,300,594 B1 | | 10/2012 | Bernier et al. |
| 8,325,626 B2 | | 12/2012 | Tóth et al. |
| 8,396,485 B2 | | 3/2013 | Grainger et al. |
| 8,446,899 B2 | | 5/2013 | Lei et al. |
| 8,457,145 B2 | | 6/2013 | Zimmerman et al. |
| 8,458,184 B2 | | 6/2013 | Dorogusker et al. |
| D691,636 S | | 10/2013 | Bunton |
| 8,549,638 B2 | | 10/2013 | Aziz |
| 8,553,634 B2 | | 10/2013 | Chun et al. |
| 8,644,301 B2 | | 2/2014 | Tamhankar et al. |
| 8,650,279 B2 | | 2/2014 | Mehta et al. |
| 8,669,902 B2 | | 3/2014 | Pandey et al. |
| 8,676,182 B2 | | 3/2014 | Bell et al. |
| 8,682,279 B2 | | 3/2014 | Rudolf et al. |
| 8,693,367 B2 | | 4/2014 | Chowdhury et al. |
| 8,718,644 B2 | | 5/2014 | Thomas et al. |
| 8,761,174 B2 | | 6/2014 | Jing et al. |
| 8,768,389 B2 | | 7/2014 | Nenner et al. |
| 8,849,283 B2 | | 9/2014 | Rudolf et al. |
| 8,909,698 B2 | | 12/2014 | Parmar et al. |
| 8,958,318 B1 | | 2/2015 | Hastwell et al. |
| 9,060,352 B2 | | 6/2015 | Chan et al. |
| 9,130,859 B1 | | 9/2015 | Knappe |
| 9,173,084 B1 | | 10/2015 | Foskett |
| 9,173,158 B2 | | 10/2015 | Varma |
| D744,464 S | | 12/2015 | Snyder et al. |
| 9,270,709 B2 | | 2/2016 | Shatzkamer et al. |
| 9,271,216 B2 | | 2/2016 | Friman et al. |
| 9,281,955 B2 | | 3/2016 | Moreno et al. |
| D757,424 S | | 5/2016 | Phillips et al. |
| D759,639 S | | 6/2016 | Moon et al. |
| 9,369,387 B2 | | 6/2016 | Filsfils et al. |
| 9,389,992 B2 | | 7/2016 | Gataullin et al. |
| 9,426,305 B2 | | 8/2016 | De Foy et al. |
| D767,548 S | | 9/2016 | Snyder et al. |
| 9,467,918 B1 | | 10/2016 | Kwan |
| D776,634 S | | 1/2017 | Lee et al. |
| 9,544,337 B2 | | 1/2017 | Eswara et al. |
| 9,569,771 B2 | | 2/2017 | Lesavich et al. |
| 9,609,504 B2 | | 3/2017 | Karlqvist et al. |
| 9,615,268 B2 | | 4/2017 | Navarro et al. |
| 9,634,952 B2 | | 4/2017 | Gopinathan et al. |
| 9,642,167 B1 | | 5/2017 | Snyder et al. |
| 9,654,344 B2 | | 5/2017 | Chan et al. |
| 9,712,444 B1 | | 7/2017 | Bolshinsky et al. |
| 9,713,114 B2 | | 7/2017 | Yu |
| 9,736,056 B2 | | 8/2017 | Vasseur et al. |
| 9,762,683 B2 | | 9/2017 | Karampurwala et al. |
| 9,772,927 B2 | | 9/2017 | Gounares et al. |
| 9,820,105 B2 | | 11/2017 | Snyder et al. |
| D804,450 S | | 12/2017 | Spiel et al. |
| 9,858,559 B2 | | 1/2018 | Raleigh et al. |
| 9,860,151 B2 | | 1/2018 | Ganichev et al. |
| 9,923,780 B2 | | 3/2018 | Rao et al. |
| 9,933,224 B2 | | 4/2018 | Dumitriu et al. |
| 9,961,560 B2 | | 5/2018 | Farkas et al. |
| 9,967,906 B2 | | 5/2018 | Verkaik et al. |
| 9,980,220 B2 | | 5/2018 | Snyder et al. |
| 9,985,837 B2 | | 5/2018 | Rao et al. |
| 9,998,368 B2 | | 6/2018 | Chen et al. |
| 10,108,954 B2 | | 10/2018 | Dunlevy et al. |
| 10,164,779 B2 | | 12/2018 | Uhr et al. |
| 10,171,248 B2 | | 1/2019 | King |
| 2003/0087645 A1 | | 5/2003 | Kim et al. |
| 2003/0116634 A1 | | 6/2003 | Tanaka |
| 2004/0029576 A1 * | | 2/2004 | Flykt .................. H04L 63/0869 455/422.1 |
| 2004/0203572 A1 | | 10/2004 | Aerrabotu et al. |
| 2005/0090225 A1 | | 4/2005 | Muehleisen et al. |
| 2005/0166043 A1 * | | 7/2005 | Zhang .................. H04W 12/06 713/155 |
| 2005/0169193 A1 | | 8/2005 | Black et al. |
| 2005/0186904 A1 | | 8/2005 | Kowalski et al. |
| 2006/0022815 A1 | | 2/2006 | Fischer et al. |
| 2006/0030290 A1 | | 2/2006 | Rudolf et al. |
| 2006/0092964 A1 | | 5/2006 | Park et al. |
| 2006/0126882 A1 | | 6/2006 | Deng et al. |
| 2006/0146803 A1 | | 7/2006 | Bae et al. |
| 2006/0187866 A1 | | 8/2006 | Werb et al. |
| 2006/0245406 A1 | | 11/2006 | Shim |
| 2007/0037605 A1 | | 2/2007 | Logan |
| 2007/0130471 A1 | | 6/2007 | Walker Pina et al. |
| 2007/0239854 A1 | | 10/2007 | Janakiraman et al. |
| 2008/0037715 A1 | | 2/2008 | Prozeniuk et al. |
| 2008/0084888 A1 | | 4/2008 | Yadav et al. |
| 2008/0101381 A1 | | 5/2008 | Sun et al. |
| 2008/0163207 A1 | | 7/2008 | Reumann et al. |
| 2008/0233969 A1 | | 9/2008 | Mergen |

(56) References Cited

U.S. PATENT DOCUMENTS

| | | | |
|---|---|---|---|
| 2008/0298313 A1* | 12/2008 | Salminen | H04L 63/08 370/329 |
| 2009/0129389 A1 | 5/2009 | Halna DeFretay et al. | |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown et al. | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0232433 A1 | 9/2013 | Krajec et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |
| 2013/0347103 A1 | 12/2013 | Veteikis et al. | |
| 2014/0007089 A1 | 1/2014 | Bosch et al. | |
| 2014/0016926 A1 | 1/2014 | Soto et al. | |
| 2014/0025770 A1 | 1/2014 | Warfield et al. | |
| 2014/0031031 A1 | 1/2014 | Gauvreau et al. | |
| 2014/0052508 A1 | 2/2014 | Pandey et al. | |
| 2014/0059655 A1 | 2/2014 | Beckley et al. | |
| 2014/0087693 A1 | 3/2014 | Walby et al. | |
| 2014/0105213 A1 | 4/2014 | A K et al. | |
| 2014/0118113 A1 | 5/2014 | Kaushik et al. | |
| 2014/0148196 A1 | 5/2014 | Bassan-Eskenazi et al. | |
| 2014/0179352 A1 | 6/2014 | V.M. et al. | |
| 2014/0191868 A1 | 7/2014 | Ortiz et al. | |
| 2014/0198808 A1 | 7/2014 | Zhou | |
| 2014/0222997 A1 | 8/2014 | Mermoud et al. | |
| 2014/0233460 A1 | 8/2014 | Pettus et al. | |
| 2014/0269321 A1 | 9/2014 | Kamble et al. | |
| 2014/0302869 A1 | 10/2014 | Rosenbaum et al. | |
| 2014/0337824 A1 | 11/2014 | St. John et al. | |
| 2014/0341568 A1 | 11/2014 | Zhang et al. | |
| 2015/0016286 A1 | 1/2015 | Ganichev et al. | |
| 2015/0016469 A1 | 1/2015 | Ganichev et al. | |
| 2015/0023176 A1 | 1/2015 | Korja et al. | |
| 2015/0030024 A1 | 1/2015 | Venkataswami et al. | |
| 2015/0043581 A1 | 2/2015 | Devireddy et al. | |
| 2015/0063166 A1 | 3/2015 | Sif et al. | |
| 2015/0065161 A1 | 3/2015 | Ganesh et al. | |
| 2015/0087330 A1 | 3/2015 | Prechner et al. | |
| 2015/0103818 A1 | 4/2015 | Kuhn et al. | |
| 2015/0163192 A1 | 6/2015 | Jain et al. | |
| 2015/0172391 A1 | 6/2015 | Kasslin et al. | |
| 2015/0223337 A1 | 8/2015 | Steinmacher-Burow | |
| 2015/0256972 A1 | 9/2015 | Markhovsky et al. | |
| 2015/0264519 A1 | 9/2015 | Mirzaei et al. | |
| 2015/0280827 A1 | 10/2015 | Adiletta et al. | |
| 2015/0288410 A1 | 10/2015 | Adiletta et al. | |
| 2015/0326704 A1 | 11/2015 | Ko et al. | |
| 2015/0358777 A1 | 12/2015 | Gupta | |
| 2015/0362581 A1 | 12/2015 | Friedman et al. | |
| 2016/0007315 A1 | 1/2016 | Lundgreen et al. | |
| 2016/0044627 A1 | 2/2016 | Aggarwal et al. | |
| 2016/0099847 A1 | 4/2016 | Melander et al. | |
| 2016/0100395 A1 | 4/2016 | Xu et al. | |
| 2016/0105408 A1 | 4/2016 | Cooper et al. | |
| 2016/0127875 A1 | 5/2016 | Zampini, II | |
| 2016/0146495 A1 | 5/2016 | Malve et al. | |
| 2016/0330045 A1 | 11/2016 | Tang et al. | |
| 2016/0344641 A1 | 11/2016 | Javidi et al. | |
| 2017/0026974 A1 | 1/2017 | Dey et al. | |
| 2017/0180134 A1 | 6/2017 | King | |
| 2017/0180999 A1 | 6/2017 | Alderfer et al. | |
| 2017/0181136 A1 | 6/2017 | Bharadwaj et al. | |
| 2017/0195205 A1 | 7/2017 | Li et al. | |
| 2017/0202000 A1 | 7/2017 | Fu et al. | |
| 2017/0214551 A1 | 7/2017 | Chan et al. | |
| 2017/0214675 A1 | 7/2017 | Johnsrud et al. | |
| 2017/0243208 A1 | 8/2017 | Kurian et al. | |
| 2017/0273083 A1 | 9/2017 | Chen et al. | |
| 2017/0317997 A1 | 11/2017 | Smith et al. | |
| 2017/0330180 A1 | 11/2017 | Song et al. | |
| 2017/0332421 A1 | 11/2017 | Sternberg et al. | |
| 2017/0339706 A1 | 11/2017 | Andreoli-Fang et al. | |
| 2018/0039667 A1* | 2/2018 | Pierce | G06Q 40/04 |
| 2018/0063018 A1 | 3/2018 | Bosch et al. | |
| 2018/0069311 A1 | 3/2018 | Pallas et al. | |
| 2018/0084389 A1 | 3/2018 | Snyder et al. | |
| 2018/0136633 A1 | 5/2018 | Small et al. | |
| 2018/0139056 A1 | 5/2018 | Imai et al. | |
| 2018/0253539 A1 | 9/2018 | Minter et al. | |
| 2018/0294966 A1 | 10/2018 | Hyun et al. | |
| 2018/0343128 A1 | 11/2018 | Uhr et al. | |
| 2018/0367314 A1* | 12/2018 | Egner | H04L 9/3239 |
| 2018/0374094 A1 | 12/2018 | Kohli | |

FOREIGN PATENT DOCUMENTS

| | | |
|---|---|---|
| WO | WO 2015/131920 | 9/2015 |
| WO | WO 2017/078657 | 5/2017 |
| WO | WO 2017/080518 A1 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

NPL Search Results (Year: 2020).*
Yang, Hui, et al. "Blockchain-based Trusted Authentication in Cloud Radio over Fiber Network for 5g." Optical Communications and Networks (ICOCN), 2017 16th International Conference on. IEEE, 2017, 3 pages.
Moinet, Axel, et al., "Blockchain based trust & authentication for decentralized sensor networks," Jun. 6, 2017, 6 pages.
"Cisco ASR 5x00 Mobility Management Entity Administration Guide," Version 15.0, Cisco Systems, Inc., Last updated Jun. 13, 2014, pp. 1-266.
"Cisco 10000 Series Router Quality of Service Configuration Guide, Chapter 20: Configuring Quality of Service for MPLS Traffic," Cisco Systems, Inc., Updated Nov. 17, 2013, pp. 1-34.
"Enterprise Mobility 7.3 Design Guide, Chapter 11: CISCO Mobility Services Engine," Cisco Systems, Inc., Updated Apr. 20, 2015, 8 pages.
"I Love WiFi, the difference between L2 and L3 Roaming Events," Apr. 1, 2010, 6 pages.
"Quality of Service Regulation Manual," ITU 2017, pp. 1-174.
"Wi-FI Location-Based Services 4.1 Design Guide," May 20, 2008, 206 pages.
Afolabi, Ibrahim, et al., "Network Slicing & Softwarization: A Survey on Principles, Enabling Technologies & Solutions," Mar. 21, 2018, pp. 1-24.

(56) References Cited

OTHER PUBLICATIONS

Ali, Z., et al., "Performance Measurement in Segment Routing Networks with IPv6 Data Plane (SRv6)," Spring Working Group, Feb. 26, 2018, pp. 1-17.
An, Xueli, et al., "Virtualization of Cellular Network EPC Gateways based on a Scalable SDN Architecture," IEEE, Feb. 12, 2015, pp. 1-7.
Antonioli, Roberto, et al., "Dual Connectivity for LTE-NR Cellular Networks," Research Gate, Sep. 3-6, 2017, pp. 171-175.
Bekan, Adnan, et al., "D5.1: Machine Learning Algorithms Development and Implementation," 2016-2018 eWINE Consortium, 23, 2016, pp. 1-72.
Bogale, Tadilo Endeshaw, et al., "Machine Intelligence Techniques for Next-Generation Context-Aware Wireless Networks," arxiv.org, Jan. 12, 2018, pp. 1-10.
Carter, Steve SR., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cheng, W., et al., "Path Segment in MPLS Based Sement Routing Network," Network Working Group, Oct. 2017, pp. 1-10.
Christidis, Konstantinos, et al., "Blockchains and Smart Contracts for the Internet of Things," IEEE Access, Special Section on the of Research in Internet of Things (IoT), vol. 4, May 10, 2016, pp. 1-12.
Cox, Jacob H. Jr., et al., "Advancing Software-Defined Networks: A Survey," IEEE, Oct. 12, 2017, pp. 25487-25526.
Cui, Wenzhi et al., "DiFS: Distributed Flow Scheduling for Data Center Networks," Nanjing University, China, Jul. 28, 2013, 10 pages.
Doyle, Matthew G., "An IP Address Management Solution for a Server Solution Provider," A Dissertation Submitted to the University of Liverpool, Sep. 28, 2005, 116 pages.
Galvan T., Carlos E., et al., "Wifi bluetooth based combined positioning algorithm," International Meeting of Electrical Engineering Research ENIINVIE 2012, Procedia Engineering 35 (2012 ), pp. 101-108.
Geller, Michael, et al. , "5G Security Innovation with Cisco," Whitepaper Cisco Public, Jun. 8, 2018, pp. 1-29.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Herb, Daniel, et al., "ROAUM: How to Unblock Roaming IoT Using BLockchain," available at https://uploads-ssl.webflow.com/ 5987a08baeea4300016b7bd9/5a7a6d6cee5bc400010a08f2_Roaum_ Roaming_IoT_Whitepaper.pdf, pp. 1-14.
Hsieh, Cynthia, "Location Awareness in VMware View 4.5 and Above," VMware, 2011, 8 pages.
Husain, Syed, et al., "Mobile Edge Computing with Network Resource Slicing for Internet-of-Things," IEEE 2017, pp. 1-7.
Jero, Samuel, et al., "Identifier Binding Attacks and Defenses in Software-Defined Networks," USENIX, The Advanced Computing Systems Association, Aug. 16-18, 2017, 19 pages.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Leonhardt, Ulf, "Supporting Location-Awareness in Open Distributed Systems," May 1998, 186 pages.
Morozov, Yury, "Blockchain Telecom: Bubbletone Blockchain," Dec. 29, 2017, pp. 1-33.
Network Heresy, "NVGRE, VXLAN and What Microsoft is Doing Right," Oct. 3, 2011, 5 pages.
Norwegian National Security Authority, "N-03 Security guidance for switches and routers," Sep. 26, 2012, pp. 1-24.
Saraiva de Sousa, Nathan F., et al., "Network Service Orchestration: A Survey," IEEE Communications Surveys & Tutorials, Mar. 23, 2018, pp. 1-30.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Shwetha, D., et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.
Sun, et al., "The future of Wi-Fi," IEEE Communications Magazine, vol. 52, No. 11, Nov. 21, 2014, 166 pages.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
Wright, Joshua, "Detecting Wireless LAN MAC Address Spoofing," Jan. 21, 2003, pp. 1-20.
Zickau, Sebastian, et al., "Enabling Location-based Policies in a Healthcare Cloud Computing Environment," 2014 IEEE 3rd International Conference on Cloud Networking (Cloudnet), Oct. 2014, pp. 353-358.
International Search Report and Written Opinion from the International Searching Authority, dated Jul. 31, 2019, 12 pages, for corresponding International Patent Application No. PCT/US2019/ 035146.
Alvarenga, Igor D., et al., "Securing Configuration Management and Migration of Virtual Network Functions Using Blockchain," Apr. 23, 2018, pp. 1-9.

\* cited by examiner

SECURING COMMUNICATIONS FOR ROAMING USER EQUIPMENT (UE) USING A NATIVE BLOCKCHAIN PLATFORM

CROSS REFERENCE TO RELATED APPLICATIONS

This application is a continuation of U.S. patent application Ser. No. 16/171,190 filed on Oct. 25, 2018, which claims the benefit of U.S. Provisional Patent Application Ser. No. 62/682,778 filed on Jun. 8, 2018, the contents of which are incorporated by reference in their entireties.

TECHNICAL FIELD

The present subject matter relates generally to communication networks, and more particularly, to natively integrating blockchain technologies in telecommunication networks (e.g., 4G, 5G, etc.) to provide security for roaming User Equipment (UE).

BACKGROUND

An ever-increasing consumer demand, improved technological advancements (e.g., hardware/software infrastructure), and industry collaboration has driven significant growth in modern telecommunication networks and continues to drive its evolution. Indeed, each iteration or "next generation" of network capabilities, e.g., represented by standards promulgated by a Third Generation Partnership Project (3GPP), interconnects more devices, improves network bandwidth, increases data-rates, and so on. For example, a transition from $3^{rd}$ Generation (3G) networks to $4^{th}$ Generation (4G) networks introduced new network services and connected mobile devices to third party data networks such as the Internet. More recently, a transition is underway from existing 4G networks to new 5G networks, which includes a new service-oriented architecture for provisioning network services/resources in a dynamic, scalable, and customizable fashion (e.g., micro-services, network functions virtualization (NFV), etc.). This service-oriented architecture, which employs network slices, creates new opportunities to develop scalable roaming security mechanisms in the context of roaming registration and/or roaming session management in order to natively support virtual, stateless, statistic, and dynamically mobile workloads and improve overall UE mobility in 5G networks.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
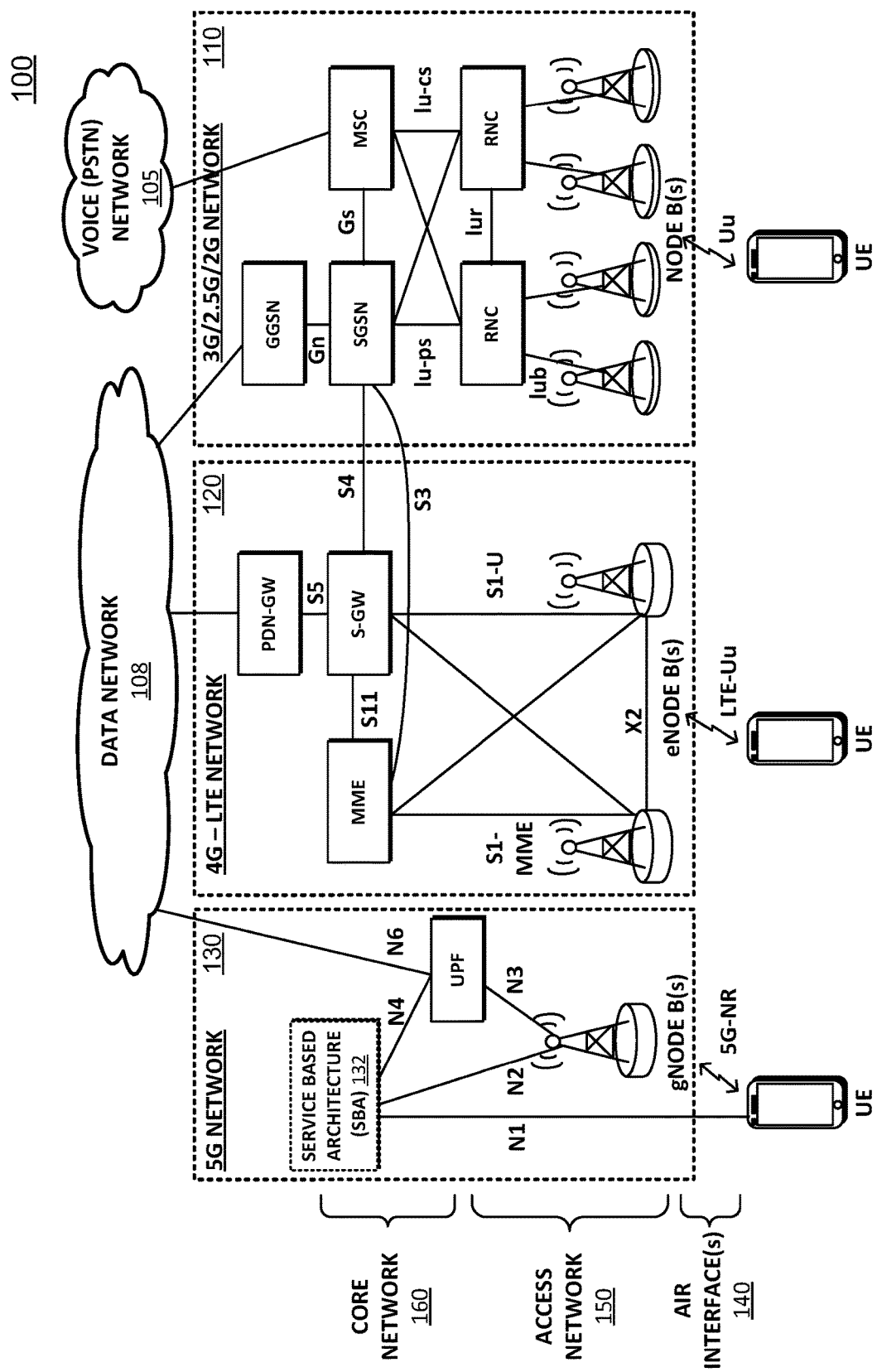
FIG. 1 illustrates a schematic block diagram of exemplary telecommunication networks, including a 3G network, a 4G network, and a 5G network.

This disclosure describes techniques for registering User Equipment (UE) in a telecommunication network (e.g., 4G/5G networks, etc.) using a natively integrated blockchain platform. In particular, the techniques can support complimentary or substitute blockchain authentication procedures for any User Equipment (UE) attaching to a 5G network. For example, according to one or more embodiments of this disclosure, a network function (NF) entity in a communication network receives authentication data associated with a UE, determines the UE supports a blockchain authentication procedure (e.g., based on the authentication data), and further exchanges authentication messages with a Blockchain Roaming Broker entity over a blockchain network interface. The NF entity can further receive a blockchain authentication confirmation from the BRB entity, and register the UE based on the blockchain authentication confirmation. In some embodiments, the NF entity can include an Access and Mobility Management Function (AMF) entity and/or an Authentication Server Function (AUSF) entity. Further the BRB entity may act as an agent or a gateway to a Blockchain Authentication Function (BAF) entity. Notably, the AMF entity may communicate directly with the BRB entity over the blockchain network interface and/or the AMF entity can invoke the AUSF entity to perform the authentication procedure and communicate with the BRB entity over another blockchain network interface.

In other embodiments, this disclosure also describes techniques for managing data sessions (e.g., establishing, handover, modify, etc.) for User Equipment (UE) in a telecommunication network (e.g., 4G/5G networks, etc.) using the natively integrated blockchain platform. For example, a network function (NF) entity in a communication network receives session request data associated with a User Equipment (UE), which includes blockchain authentication data. The NF entity selects a Blockchain Authentication Function (BAF) entity based on the session request data, and exchanges at least a portion of the blockchain authentication data with the BAF entity over a blockchain network interface. The NF entity further receives authentication confirmation data from the BAF entity over the blockchain network interface, and establishes a data session associated with the UE based on the authentication confirmation data.

Description

Various embodiments of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), which include a number of network devices/modules/entities or "Network Function(s)" (NF(s)), as is appreciated by those skilled in the art. For sake of clarity, the NFs described herein are based on NFs specified by existing Technical Specifications such as the 3GPP TS 23.501, TS 23.502, TS 24.501, TS 29.509, TS 29.518, TS 33.301, TS 33.501, each of which is incorporated herein by reference to its entirety. Moreover, while some operations and functionality may be described and/or attributed to a particular NF, it is appreciated that such operations are not intended to be limited to the particular NF, but may be performed by other NFs as appropriate, particularly in view of the ongoing development and evolving nature of telecommunication networks.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

FIG. 1 illustrates a schematic block diagram of exemplary telecommunication networks 100, including a 3G network 110, a 4G network 120, and 5G network 130. Telecommunication networks 100 include wireless network interfaces or communication links, such as air interfaces 140, an access network 150, which represents radio infrastructure or radio towers, and a core network 160, which represents respective core network entities, network modules, or Network Functions (NF(s)). The wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used, and that the view shown herein is for simplicity. In particular, the representations of telecommunication networks 100, including respective interconnected network entities, are illustrated and described herein for purposes of discussion, not limitation, and it is appreciated that the illustrated networks can include (or exclude) any number of network entities, communication links, and the like, and can support inter-network operability and compatibility.

Access network 150 represents the infrastructure or radio towers, such as a Radio Access Network (RAN), for receiving and transmitting data packets between end user nodes (UE) as well as the various network entities (e.g., core network entities). Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks.

Respective network entities that form core network 160 (within the telecommunication networks 100) operatively connect respective RAN infrastructure (NBs, eNBs, gNBs) to third party networks such as a voice network 105 (e.g., a Public Switched Telephone Network (PSTN) network) and/or a data network 108 to create end-to-end connections. Prior to 3G (e.g., 2G, 2.5G, etc.) the third party network primarily included a voice network/PSTN 105 (e.g., a circuit switched network). From 3G onward, the third party network transitioned to include a public network (e.g., the Internet), represented by data network 108 (e.g., a packet switched network). Core network 160 and its respective network entities collectively operate to manage connections, bandwidth, and mobility for respective UE.

Notably, core network 160 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 110, session management includes a standalone General Packet Radio Service (GPRS) network, while 4G network 120 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

5G network 130, as discussed in greater detail herein, introduces a new service base architecture (SBA) 132, which generally redistributes functionality of 4G network entities into smaller service-based functions/network entities. In addition, packet routing and forwarding functions (which are performed by SGW and PGW in 4G network 120) are realized as services rendered through a new network function/entity called the User Plane Function (UPF). In this fashion, 5G network 130 provides a modular set of services that support dynamic and scalable deployment of resources to satisfy diverse user demands.

Figure 2:
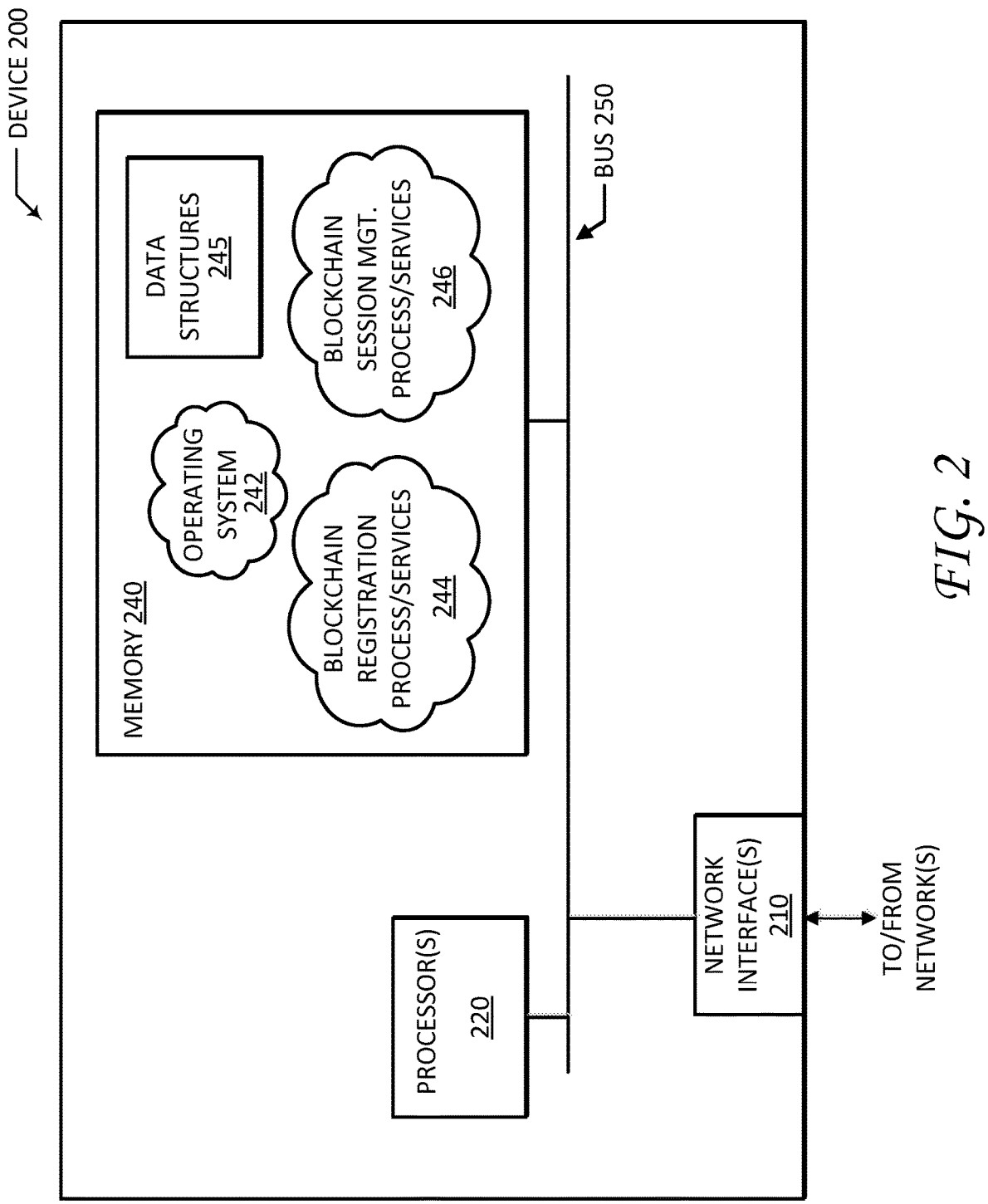
FIG. 2 illustrates a schematic block diagram of an exemplary network device, such as a Network Function (NF) entity/module, according to one or more embodiments of this disclosure.

FIG. 2 illustrates a schematic block diagram of an exemplary network device or Network Function (NF) entity 200 that may be used with one or more embodiments described herein, e.g., particularly as User Equipment (UE) and/or other NFs within SBA 132 (e.g., an Access and Mobility Management Function (AMF) entity, Authentication Server Function (AUSF) entity, and so on).

The illustrative device 200 comprises one or more network interfaces 210, at least one processor 220, and a memory 240 interconnected by a system bus 250. Network interface(s) 210 contain the mechanical, electrical, and signaling circuitry for communicating data over links (e.g., wires or wireless links) within the telecommunication networks 100 (e.g., ref. FIG. 1). Network interfaces 210 may be configured to transmit and/or receive data using a variety of different communication protocols, as will be understood by those skilled in the art. Notably, network interfaces 210 may include new blockchain network interfaces (e.g., "BCx", "BCy", and/or "BCz") as discussed in greater detail below.

Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of services and/or software processes executing on the device/module. These services and/or software processes may comprise an illustrative "blockchain registration" process/service 244 as well as a "blockchain session management" process/services 246, as described herein. Note that while processes/services 244 and 246 are shown in centralized memory 240, some embodiments provide for these processes/services to be operated in a distributed communication network.

Illustratively, the techniques described herein may be performed by hardware, software, and/or firmware, such as in accordance with the illustrative blockchain registration process 244 and/or the illustrative blockchain session management process 246, which may contain computer executable instructions executed by processor 220 to perform functions relating to UE authentication and/or UE session establishment, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having blockchain registration process 244 and/or blockchain session management process 246 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, a transition is currently underway from existing 4G networks to new 5G networks, which includes a new service-oriented architecture (e.g., SBA 132—FIG. 1). Traditional processes employed by 3G and 4G networks to provision network resources, ensure appropriate levels of security, and support UE roaming and mobility (e.g., registration, session establishment, session maintenance, and so on) were developed and optimized based on then-existing voice network (e.g., circuit-switched) infrastructure and/or conventional data network (e.g., packet switched) infrastructure. For example, UE roaming in existing mobile network infrastructures is typically based on statically configured security parameters, e.g., authentication using Open Mobile Alliance (OMA) Device Management (DM) signaling, Non-Access-Stratum (NAS) protocols, key exchanges using public/private keys, statically configured security roles, and so on. In addition, existing service providers typically implement their own security mechanisms, which in turn, results in different security requirements across multiple providers further complicating inter-operability, roaming, and network resource sharing.

The new service based infrastructure for 5G networks provisions network services/resources in a dynamic, scalable, and customizable fashion using network slices, microservices, network functions virtualization (NFV), and so on. In the context of a network slice, each network slice can include an isolated set of programmable resources that may implement individual network functions and/or application services through software programs within a respective network slice, without interfering with other functions and services on coexisting network slices. The new service based infrastructure, including the granular network slice approach, raises new challenges for providing comprehensive security mechanisms at multiple levels and across domains.

As provided herein, this disclosure describes a natively integrated blockchain security infrastructure that uses a federated, sponsored, and/or authorized blockchain enterprise platform to support scalable roaming security mechanisms in the context of roaming UE registration and/or roaming UE session management. In particular, this blockchain enterprise platform provides a distributed trust mechanism that establishes a resilient level of security for workload instantiation or resource boot as well as workload attestation after boot. This resilient level of security inherently relies upon the distributed nature of blockchain technologies.

Blockchain technologies generally facilitate transparent, verifiable, and secure digital asset transactions with proof of rights and ownership. For example, blockchain technologies generally employ distributed ledger technology (DLT) with built-in cryptography to enable open and trusted exchanges over the internet without requiring central servers and/or independent trusted authorities. Although blockchain technologies can be non-natively employed within existing telecommunication networks, mobile network operators and/or mobile network entities are generally unaware of blockchain transactions because such blockchain transactions generally only occur after a mobile session is established (e.g., using overlay messages), which in turn, inhibits blockchain technology integration and participation by mobile service providers.

Accordingly, as described in greater detail herein, the blockchain platform of this disclosure is natively integrated with the service based architecture (SBA) of the 5G network through new blockchain network interfaces such as BCx and Bcy. The blockchain platform includes a network of blockchain service providers as well as a blockchain roaming agent, which is operable to provide roaming UE security within networks and between different network providers. As described in greater detail herein, these new roaming security mechanisms include roaming blockchain registration as well as roaming blockchain session management for UE. For example, the blockchain roaming agent may employ the roaming security mechanisms to support device registration processes within a mobile network, device registration in the context of a roaming network (e.g., when UE is outside of its local/home network and attempts to connect to a roaming/visiting network), and device session management processes to improve overall UE mobility in 5G networks.

Figure 3A:
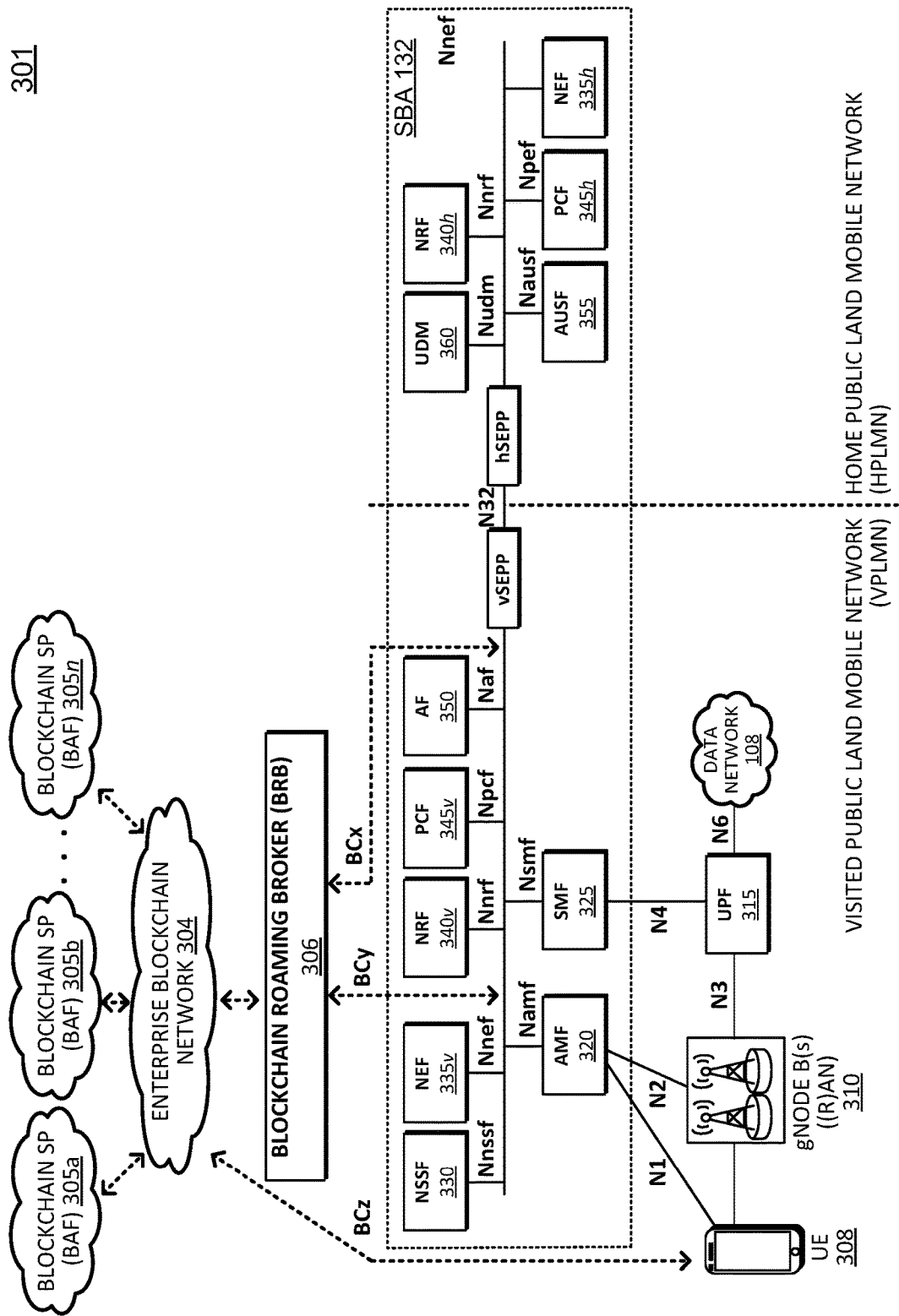
FIG. 3A illustrates schematic block diagram of a roaming architecture with a local breakout scenario for a service based interface representation of a Service Based Architecture (SBA)
Figure 3B:
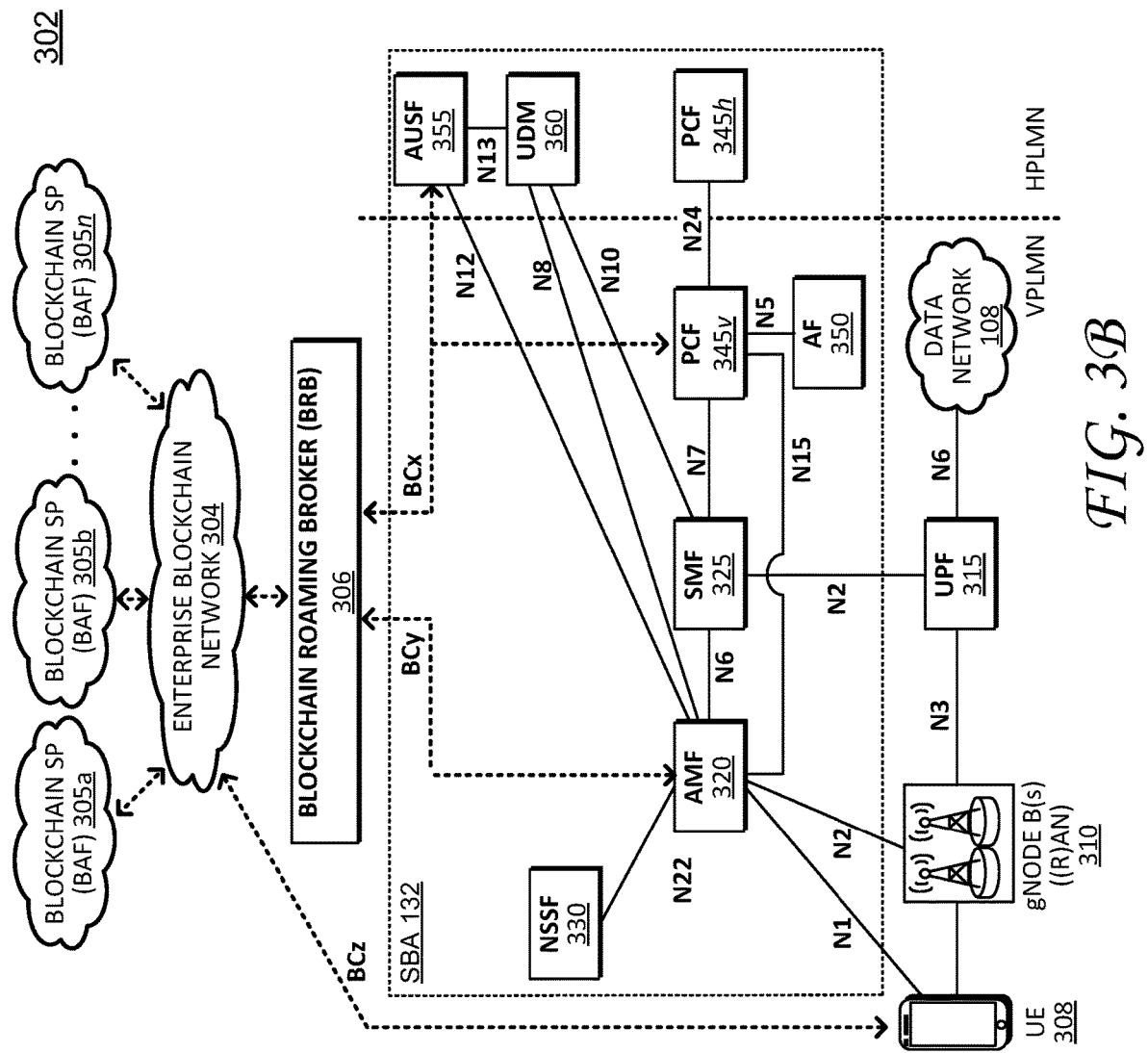
FIG. 3B illustrates a schematic block diagram of a reference point representation of the roaming architecture shown in FIG. 3A, according to one embodiment of this disclosure.
Figure 3C:
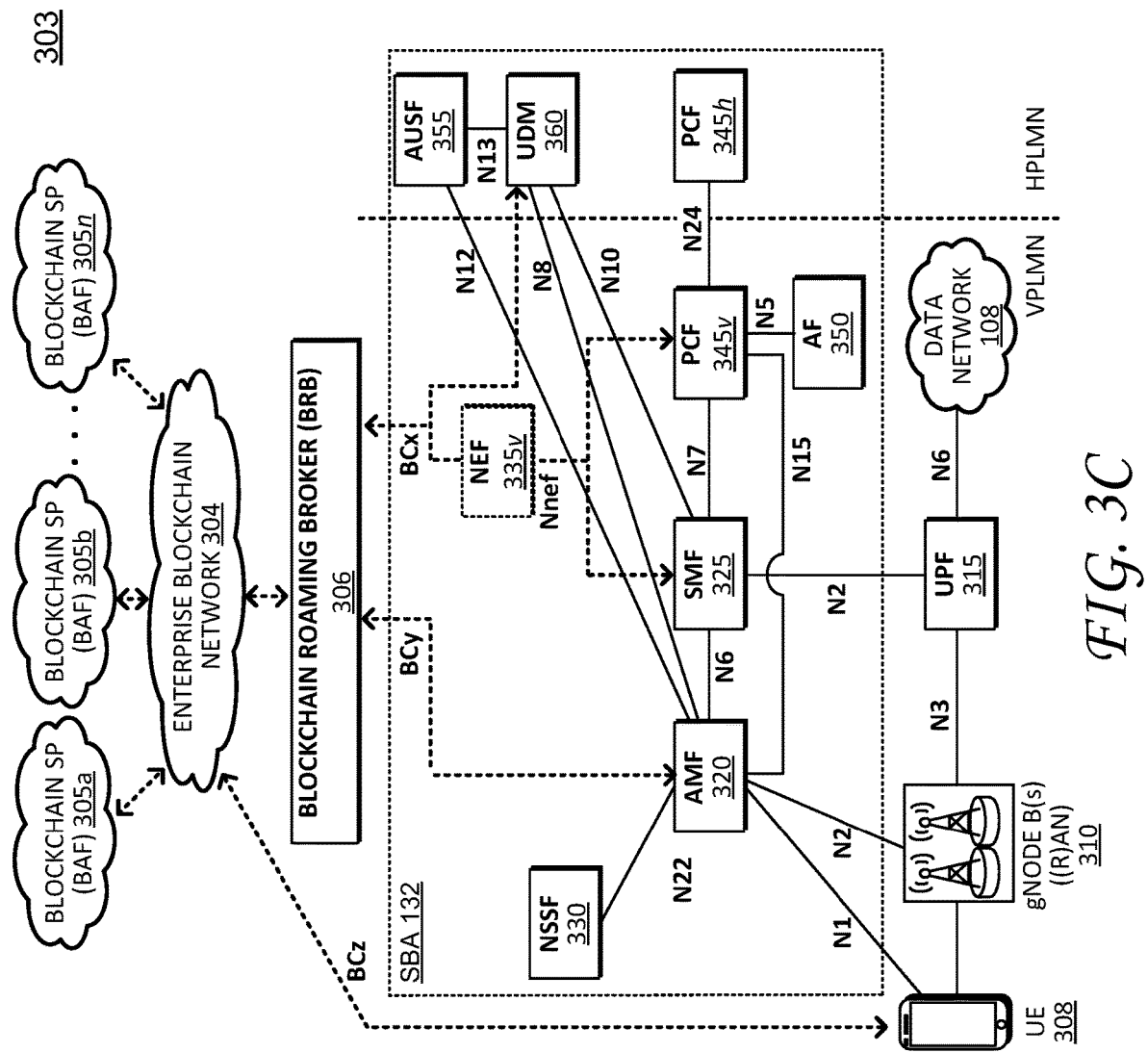
FIG. 3C illustrates a schematic block diagram of another reference point representation of the roaming architecture shown in FIG. 3A.

Referring again to the figures, FIG. 3A illustrates a schematic block diagram 301, showing a blockchain platform natively integrated with a Service Based Architecture (SBA) 132 for an exemplary 5G network (e.g., 5G network 130). FIGS. 3B and 3C illustrates schematic block diagram 302 and 303, respectively, showing example embodiments of reference point architectures for the blockchain platform of FIG. 3A. Collectively, FIGS. 3A-3C show a native blockchain platform, which includes an enterprise blockchain network 304 of interconnected blockchain service providers (SPs) or Blockchain Authentication Function (BAF) entities 305a-305n (e.g., distributed ledger technology (DLT) entities, etc.), and a Blockchain Roaming Broker (BRB) entity 306, which acts as a software defined agent accessible to various network entities of SBA 132 (e.g., over blockchain network interfaces BCx, BCy, and BCz, etc.)

Notably, the illustrated blockchain network interfaces BCx, BCy, and BCz may be represented by network interfaces 210 for device/entity 200, discussed above. Further, these blockchain network interfaces represent communication links that facilitate exchanging messages or data packets between BAF(s), BRB 306, and core network entities (e.g., NFs) that form SBA 132. For example, BCx can facilitate exchanging messages related to policy request, authorization, network usage, lawful intercept, accounting, and the like. BCy can facilitate exchanging messages related to secondary authentication, authorization, resource sharing, lawful intercept, network slicing, etc. BCz can facilitate exchanging messages related to standalone Authentication public key pre-set, authorization, Distributed Ledger Technology query/set, etc.

Blockchain network 304 helps establish trust by way of immutable distributed records, which are accessible to BAFs 305 as well as BRB 306. In operation, NFs of SBA 132 can access the immutable distributed records of blockchain network 304 to authenticate, authorize, or otherwise provide roaming security for UE registration processes and session management processes. In this fashion, blockchain network 304 can create specific trust boundaries across multiple service providers using distributed blockchain ledgers, which can be leveraged when sharing network resources or providing access to network functions (NFs) such as Access and Mobility Management Function (AMF), Session Management Function (SMF), Network Repository Function (NRF), and so on, as discussed in greater detail herein. Blockchain network 304 may represent an open source blockchain network, a public blockchain network, and/or a private blockchain network, and may include distributed ledger technologies such as hyperledger Sawtooth, and the like.

Referring again to FIG. 3A, schematic block diagram 301 illustrates a roaming architecture with a local breakout scenario for a service based interface representation of SBA 132. Roaming generally refers to situations where the UE from one network (e.g., a home network) operates in another network (e.g., a visiting network). Typical roaming networks can include, for example, an Internet Protocol (IP) Packet eXchange (IPX) Network for 4G and 5G technologies, which is an inter-Service Provider IP backbone that includes interconnected networks of IPX Providers. For 2G and 3G technologies General Packet Radio Service (GPRS) Roaming eXchange (GRX) is used to provide roaming capabilities. Both GRX and IPX networks operably exchange IP based traffic between customers of separate mobile and fixed operators as well as other types of service provider (such as ISP), via IP based Network-to-Network Interface. Specifications for roaming networks can be defined by GSMA guidelines such as IR.34 guidelines for IPX provider networks, the contents of which are incorporated herein by reference to its entirety. As shown in FIG. 3A (and discussed in greater detail herein), schematic block diagram 301 includes a blockchain roaming broker (BRB) that facilitates roaming across 3G, 4G and 5G mobile technologies using secured Distributed Ledger Technologies (DLT).

The roaming architecture shown in schematic block diagram 301 includes a Visited Public Land Mobile Network (VPLMN) and a Home Public Land Mobile Network (HPLMN). A Public Land Mobile Network (PLMN) is a network established and operated by a carrier for providing mobile communication services to its subscribers. Generally, domestic subscribers for a carrier use roaming if to receive services from abroad. A HPLMN refers to the subscriber's home network (e.g., domestic carrier) while VPLMN refers to the subscriber's abroad network (where the UE may be registered while roaming). While FIG. 3A illustrates the roaming architecture with the local breakout scenario, it is appreciated other roaming architectures may be employed (e.g., home routing, etc.). Further, as shown here, some network entities such as the Session Management Function (SMF) and the User Plane Function(s) (UPF(s)) involved in a PDU session are under the control of the VPLMN.

An IPX network (not shown) may provide IP-based interoperability between the VPLMN and the HPLMN. However, such IPX network often increases costs associated with roaming due, in part, to the numerous protocols and complex IPX messaging. In addition, security requirements for a home network may be different than those of a visiting network. As discussed herein, this disclosure provides a natively integrated blockchain enterprise platform that supports blockchain registration processes and blockchain session management processes. This natively integrated blockchain enterprise platform avoids often expensive and complex signaling and message exchanges between VPLMNs and HPLMNs (and over IPX networks) and can include a Blockchain Roaming Broker (BRB) entity (e.g., BRB 306), which operably establishes trust and secures communications between UE and a mobile network (e.g., NFs that form SBA 132) using a distributed immutable record.

BRB 306 can be implemented for both domestic and international roaming and can provide instant service authorizations and network usages for roaming UE that support the blockchain registration processes and/or the blockchain session management processes. For example, BRB 306 may be accessible to network entities that form SBA 132 and reside in VPLMN and/or HPLMN.

The network entities that form SBA 132 include, for example, AMF 320, SMF 325, Network Slice Selection Function (NSSF) 330, Network Exposure Function (NEF) 335v|335h, Network Repository Function (NRF) 340v|340h, Policy Control Function (PCF) 345v|345h, and Application Function (AF) 350. These network entities can be implemented either as a network element on a dedicated hardware, as a software instance running on a dedicated hardware, or as a virtualized function instantiated on an appropriate platform, e.g., a cloud infrastructure, as is appreciated by those skilled in the art.

In general, UE 308 connects to RAN/Access Network (AN) 310 as well as AMF 320. Here, the RAN can include a base station while the AN can include a base station supporting non-3GPP access, e.g., Wi-Fi access. AMF 320 provides UE-based authentication, authorization, mobility management, etc. SMF 325 is responsible for session management, IP address allocation to UE(s), and traffic management/selection of a User Plane Function (UPF) (e.g., UPF 315) for proper routing/data transfer. If UE 308 has multiple sessions, different SMFs may be allocated to each session for individual management and/or different functionality per session. AF 350 generally provides information on packet flows to PCF 345v, which is responsible for policy control in order to support Quality of Service (QoS). Based on the information from AF 350, PCF 345v determines policies about mobility and session management for proper AMF/SMF operations. AUSF 355 stores authentication data for UE 308, and UDM 360 stores subscription data for UE 308. Data network 108 provides Internet access or operator services. The foregoing operations (and additional functionality) for respective network entities can be found in 3GPP Technical Specification (TS) 23.501 v 15.2.0 and TS 23.502v15.2.0, which is incorporated by herein by reference to its entirety.

Notably, the disclosed blockchain security operations, such as those employed for roaming UE registration and/or roaming UE session management, are discussed in greater detail below, and with reference to subsequent signaling diagrams illustrated in FIGS. 4A, 4B, 5A, and 5B. As discussed below, such blockchain security operations involve messages exchanged over the new blockchain network interfaces BCx, BCy, and BCz, and between one or more NFs in SBA 132, BRB 306, and/or BAF(s) 305.

FIG. 3B illustrates a schematic block diagram 302, showing a reference point interface representation of SBA 132 (e.g., with a local breakout (LBO) scenario). Reference point representations help develop detailed call flows in a normative standardization, which are illustrated in FIGS. 4A, 4B, 5A, and 5B and described in greater detail herein. It should be noted, for sake of clarity, certain network entities (e.g., NEF 335, NRF 340, etc.) are not shown by schematic block diagram 302. However, it is appreciated any of the illustrated network entities can interact with the non-illustrated entities as appropriate.

As illustrated, N1 carries signaling between UE 308 and AMF 320. The reference points for connecting between (R)AN 310 and AMF 320 and between (R)AN 310 and UPF 315 are defined as N2 and N3, respectively. There is a reference point, N11, between AMF 320 and SMF 325. In this fashion, SMF 325 may be controlled by AMF 320. N4 is used by SMF 325 and UPF 315 so that the UPF 315 can be set using the control signal generated by the SMF 325, and the UPF 315 can report its state to the SMF 325. N15 and N7 are defined since PCF 345 applies policy to AMF 320 and SMF 325, respectively. N12 is used AMF 320 to perform authentication of UE 308. N8 and N10 provide subscription data of UE 308 from UDM 360 to AMF 320 and SMF 325. In addition, BCy network interface interconnects AMF 320 and BRB 306 to provide alternative or supplemental authentication/registration signaling for UE 308. Notably, in some embodiments, UE 308 may be authenticated/registered by AUSF 355 over blockchain network interface BCx. In addition, BCx network interface interconnects PCF 345 and BRB 306 for data session management, including blockchain charging events/transactions. Additional reference points are illustrated and can generally operate in accordance with 3GPP specifications, as is appreciated by those skilled in the art.

FIG. 3C illustrates a schematic block diagram 303, showing another reference point interface representation of SBA 132. Here, schematic block diagram 303 particularly illustrates blockchain network interfaces BCx interconnecting BRB 306 with NEF 335, which may be invoked by SMF 325 and/or PCF 345, as discussed in greater detail herein. In addition, in some embodiments, blockchain network interface BCx may interconnect BRB 306 with UDM 360 to provide registration information.

As mentioned above, FIGS. 3A-3C illustrate a native blockchain platform, including an enterprise blockchain network 304 of interconnected blockchain service providers (SPs) or Blockchain Authentication Function (BAF) entities 305a-305n (e.g., distributed ledger technology (DLT) entities, etc.), and a Blockchain Roaming Broker (BRB) 306, which acts as a software defined agent accessible to various network entities of SBA 132 (e.g., over blockchain network interfaces BCx, BCy, and BCz, etc.) In general, this native blockchain platform can provide an additional and/or alternative blockchain security mechanisms natively employed as part of UE registration processes as well as UE data session management processes (e.g., PDN/PDU sessions, etc.) Notably, the blockchain security mechanisms may be represented by blockchain registration process/services 244, and/or blockchain session management process/services 246 (ref. FIG. 2).

The blockchain registration process generally includes operations to register and attach the UE to the core network and to encrypt and protect traffic between the UE and core network entities (e.g., SBA 132). For example, the registration operations can include exchanging authentication messages between one or more core NFs of SBA 132 and BRB 306, which is exposed to the core NFs over new blockchain network interfaces (e.g., BCy and/or BCz). In some embodiments, the core NFs can further invoke NEF 335 to transparently forward the authentication messages to/from BRB 306. BRB 306 further communicates with a corresponding BAF 305 (e.g., based on authentication information such as UE account credentials with the BAF). The corresponding BAF 305, in turn, compares the UE account credentials against UE credentials stored on a blockchain or distributed ledger. As is appreciated by those skilled in the art, the BAF returns authentication confirmation messages to BRB 306 if the UE credentials match the UE credentials stored on the blockchain or distributed ledger. BRB 306 further provides appropriate confirmation messages to the core network NFs to complete registration procedure and attach UE to the core network.

The blockchain session management process generally includes operations to establish sessions (e.g., PDU sessions/PDN sessions) with UE 308 in order to allocate session resources to relevant network slices, permit data transmission between UE 308 and data network 108, ensure appropriate Quality of Service (QoS) connectivity, satisfy Service Level Agreements (SLA(s)), and so on. Notably, the blockchain session management processes may include authentication/authorization operations, however it is appreciated such operations relate to session management and may be separate from the blockchain registration process for attaching the UE to the network. Similar to the blockchain registration process discussed above, the blockchain session management operations include exchanging messages between one or more core NFs of SBA 132 (including NEF 335 (if invoked)) and BRB entity 306 over a new blockchain network interface (e.g., BCy and/or BCz). BRB 306 further communicates with a corresponding BAF (e.g., based on the session management authentication information and/or the registration authentication information) to authenticate or authorize UE 308 for purposes of session establishment, and pass on confirmation messages back to appropriate core network entities upon successful authentication/authorization.

In proper context, and with reference to FIGS. 3A, 3B, and/or 3C, various network entities cooperate to perform initial registration and attachment processes for UE 308. In particular, RAN/Access Network (AN) 310 broadcasts system information (e.g., PLMN-IDs) to various UE(s), including UE 308. UE 308 receives the PLMN-ID from RAN/Access Network (AN) 310 and, during its initial registration, UE 308 indicates support for a complimentary (and/or substitute) blockchain procedures (e.g., the blockchain registration procedure and/or the blockchain session management procedure). For example, UE 308 can indicate support for these blockchain procedures in a radio layer message (e.g., a Radio Resource Control (RRC) message) sent to RAN/Access Network (AN) 310.

RAN/Access Network (AN) 310 receives the RRC messages from UE 308 and selects an appropriate AMF 320 (which supports the blockchain procedures) and/or redirects the RRC messages to a new AMF as appropriate. Here, RAN/AN 310 can determine the RRC message from UE 308 include an indication for the disclosed blockchain procedures (e.g., in an access category) and selects AMF 320 and/or redirects to a new AMF based on the AMF blockchain capabilities.

In some embodiments, AMF 320 receives an indication to perform the blockchain registration procedure from Non-Access Stratum (NAS) messages sent directly from UE 308 (e.g., over network interface N1) to AMF 320. In this fashion, the NAS messages can indicate UE 308 supports/request the blockchain authentication procedure, e.g., in payload data such as registration type in the NAS message, and/or in follow-on request data.

Figure 4A:
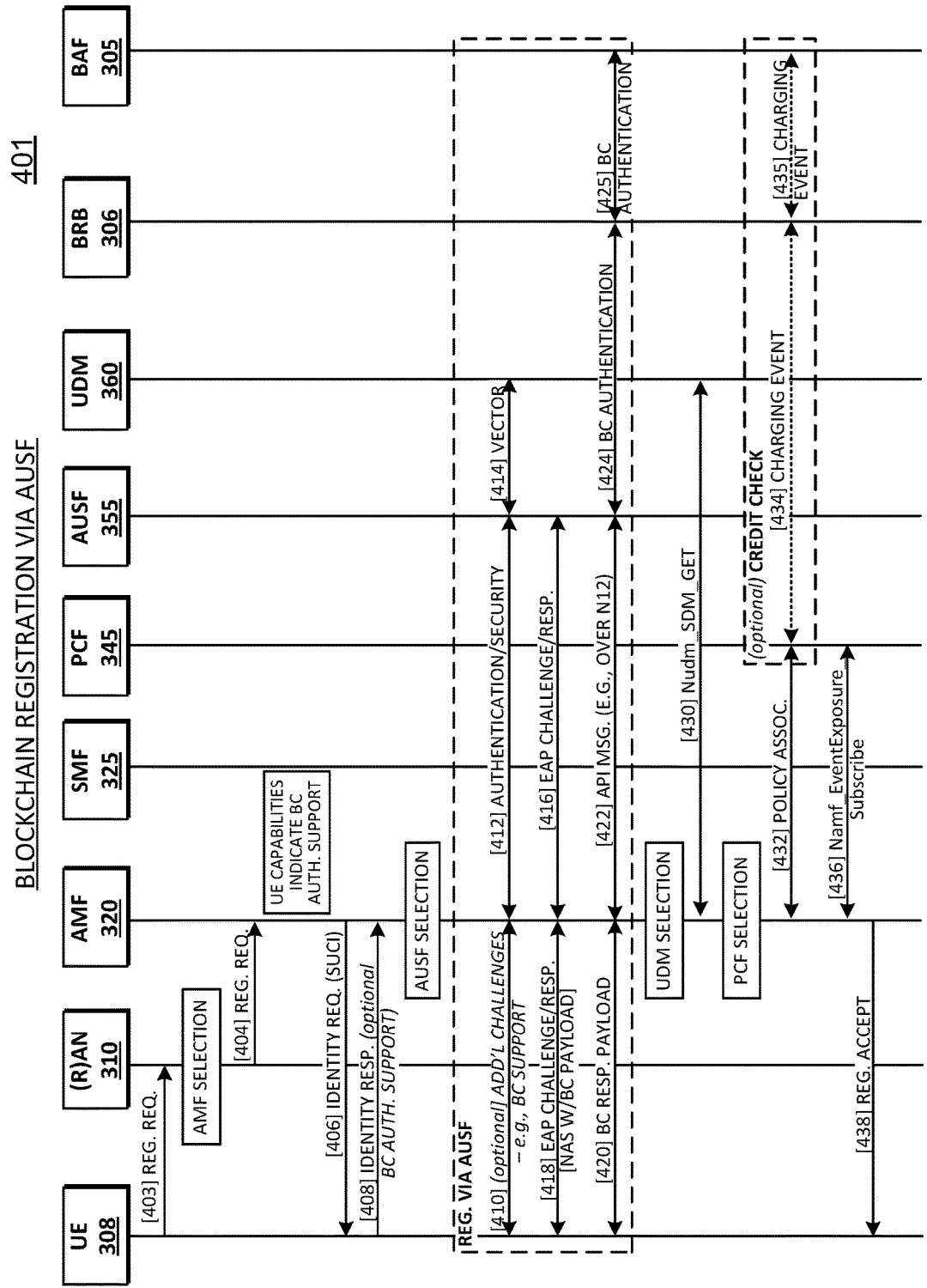
FIG. 4A illustrates a schematic signalling diagram, showing callflows for a blockchain authentication procedure where User Equipment (UE) performs attach procedures, an Access and Mobility Management Function (AMF) entity invokes an Authentication Server Function (AUSF) entity to communicate with a Blockchain Authentication Function (BAF) entity.
Figure 4B:
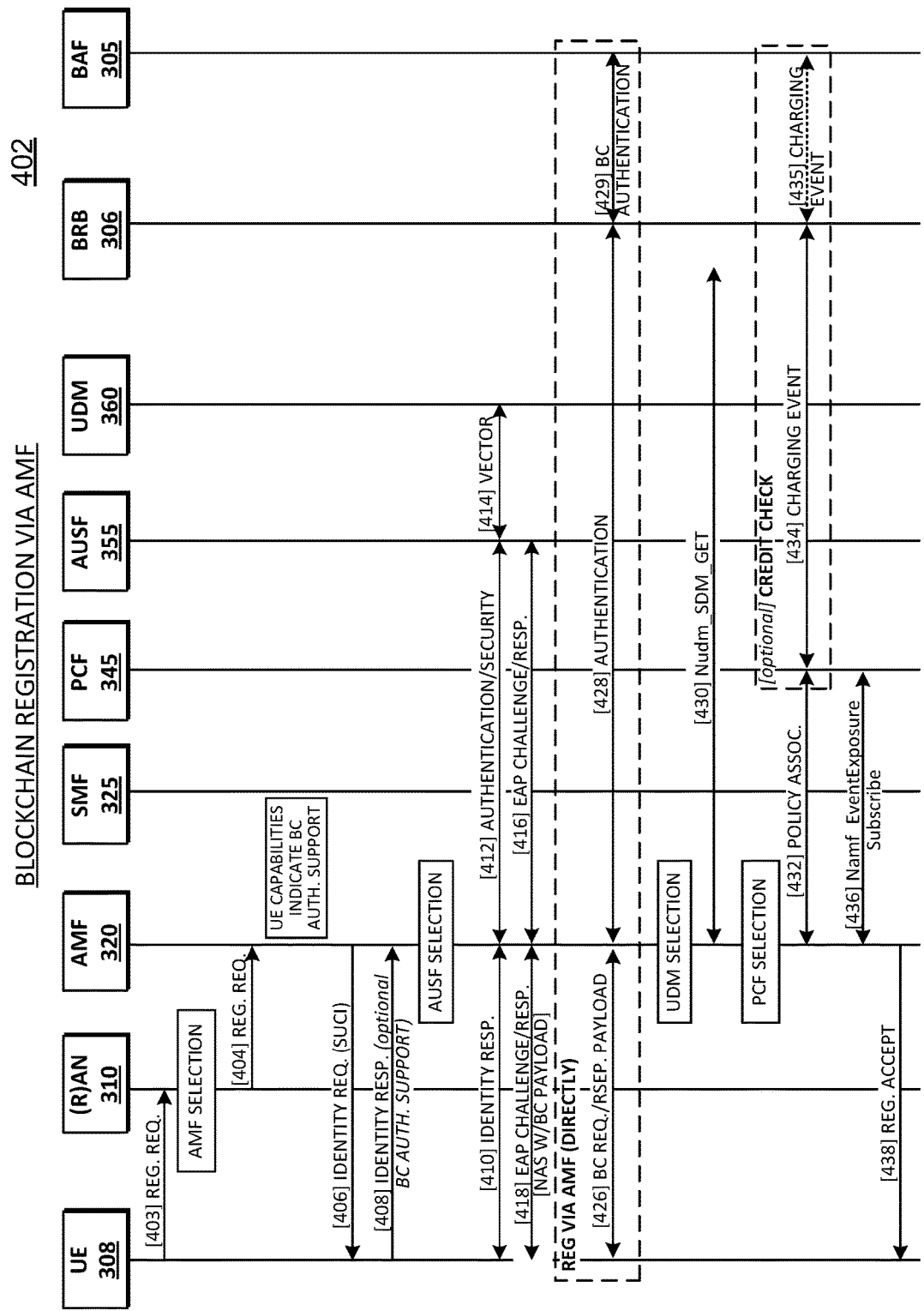
FIG. 4B illustrates a schematic signalling diagram, showing callflows for a blockchain authentication procedure where the AMF entity is in direct communication with the BAF entity.

AMF 320 further exchanges blockchain authentication messages with BRB 306, over blockchain network interfaces BCx and/or BCy. In some embodiments, AMF 320 may send authentication messages to invoke/request that AUSF 355 perform blockchain registration operations, which causes AUSF 355 to authenticate UE 308 with BRB 306 over blockchain network interface BCx (e.g., ref. FIG. 4A). In other embodiments, AMF 320 can directly authenticate UE 308 with BRB 306 over blockchain network interface BCy, using for example, REST Application Program Interface (API) messages (e.g., ref. FIG. 4B). BRB 306 further authenticates the blockchain credentials for UE 308 with a corresponding BAF 305, as mentioned above. For example, the BAF 305 receives the UE credentials, compares the UE credentials against stored UE credentials (e.g., stored on a blockchain or distributed ledger) and sends appropriate confirmation messages when the UE credentials match the stored UE credentials.

Notably, AMF 320 and/or AUSF 355 can also perform conventional registration processes in addition to the above discussed blockchain authentication operations, depending on service provider or mobile network operator security/integrity policies, as is appreciated by those skilled in the art—e.g., generating/creating encryption keys (e.g., anchor keys), sending authentication requests to AUSF 355, selecting UDM 360, retrieving vectors, e.g., credentials and/or encryption keys, from UDM 360, and so on. In this fashion, the blockchain authentication procedure can complement (or augment) existing authentication processes (e.g., 5G Extensible Authentication Protocol (EAP)—Authentication and Key Agreement (AKA) procedures defined by 3GPP TS 33.301, etc.) to serve as an enhanced or secondary form of security. In other embodiments, however, the blockchain authentication procedure can replace existing authentication processes (e.g., if existing authentication processes fail, etc.)

These and other blockchain enhanced registration features are described in greater detail with respect to the schematic signaling diagrams shown in FIGS. 4A and 4B, below.

Still referring to FIGS. 3A, 3B, and/or 3C, various network entities or NFs also cooperate to manage sessions for UE 308 (e.g., establish sessions, handover sessions, modify sessions, etc.). Sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. This connectivity service can include multiple PDU sessions, which are logical associations created between the 5G core network entities (e.g., SBA 132) and UE 308 to handle data packet exchanges. In the context of a 5G network, session management is flexible, scalable, and accommodates various service continuity modes (e.g., "make before break" options, relocation of core network functions, etc.) while maintaining seamless end-user services. The session management also supports concurrent local and central access to a data network and multi-access edge computing where an application at an edge data centre can influence traffic routing to improve its performance.

While session management is illustrated and described herein in the context of 5G networks (e.g., PDU sessions), it is appreciated such session management and related operations can readily apply to 4G networks (e.g., PDN sessions, etc.) For example, as is appreciated by those skilled in the art, 4G networks create sessions using default data bearers (e.g., 4G networks), while the 5G networks establish a PDU session as-needed or on demand, independent of UE attachment procedures. Further, UE(s) can establish multiple PDU sessions to the same data network (or to different data networks) over a single or multiple access networks (e.g., 3GPP networks, non-3GPP networks, etc.) where each PDU session is associated with network slice—e.g., one S-NSSAI and one Data Network Name (DNN). Notably, the PDU sessions can include various session types (e.g., IPv4, IPv6, Ethernet, unstructured, etc.)

In operation, UE 308 initiates session establishment by sending a PDU session request data to AMF 320 (e.g., as part of a PDU Session Establishment Request message). Notably, when UE 308 attaches to the core network (e.g., SBA 132), UE 308 exchanges mobility management messages and session management messages with AMF 320 (e.g., over an NG1 NAS network interface). Session management messages can be transmitted with the mobility management message supported by the NAS routing capability within AMF 320. Although AMF 320 is involved in sending session management messages, processing mobility messages and session management messages typically occurs in AMF 320 and SMF 325, respectively.

AMF 320 receives the PDU session request and discovers/selects an appropriate SMF (e.g., SMF 325) based on parameters included in the initial PDU session request from UE 308, such as session management service identification data, Single Network Slice Selection Assistance Information (S-NSSAI) data, Data Network Name (DNN) data, UE subscriptions, local operator policies, blockchain authentication data/capabilities, etc.). Although AMF 320 may not understand the full context of the session management messages, it can still determine/select an appropriate SMF for a new PDU session based on the above-mentioned parameters.

Here, AMF 320 selects SMF 325 and establishes a PDU session, which allocates PDU resources for a relevant network slice and permits data transmission/data packet exchanges between UE 308 and data network 108. In addition, AMF 320 also ensures that NAS signaling associated with this PDU session is handled by the same SMF (SMF 325) by assigning a PDU session identifier to the PDU session. UE 308, in turn, uses this PDU session identifier to route messages to the correct SMF.

As mentioned, PDU sessions are typically managed as part of a connectivity service (e.g., PDU Connectivity Service), which defines rules for exchanging data packets (e.g., Protocol Data Units (PDUs)) between the UE (e.g., UE 308) and a data network (e.g., data network 108) based on session-specific Quality of Service (QoS) parameters. Subscription information for each S-NSSAI can include multiple DNNs and one default DNN. When UE 308 does not specify a DNN in a NAS Message containing PDU Session Establishment Request for a given S-NSSAI, the serving AMF determines the DNN for the requested PDU Session by selecting the default DNN for this S-NSSAI if a default DNN is present in the UE's Subscription Information; otherwise the serving AMF selects a locally configured DNN for this S-NSSAI. If the DNN provided by the UE is not supported by the network and AMF cannot select an SMF by querying NRF, the AMF may reject the NAS Message containing PDU Session Establishment Request from the UE with a cause indicating that the DNN is not supported.

Each PDU Session typically supports a single PDU Session type, e.g., supports the exchange of a single type of PDU requested by UE 308 at the establishment of the PDU Session. PDU Sessions are generally established upon UE request, modified upon UE 308/SBA 132 request, and released upon UE 308/SBA 132 request using NAS session management signaling exchanged over the N1 network interface between UE 308 and SMF 325. Upon request from an Application Server, SBA 132 is able to trigger a specific application in UE 308. When receiving the trigger message, UE 308 passes it to the identified application (in UE 308). The identified application in UE 308 may establish a PDU Session to a specific DNN, in accordance with 3GPP TS 32.501, clause 4.4.5.

SMF 325 is responsible of checking whether UE requests are compliant with the user subscription. For this purpose, SMF 325 retrieves and requests to receive update notifications on SMF level subscription data from UDM 360. This subscription data can incidate (e.g., per DNN and per S-NSSAI) allowed PDU Session Types and the default PDU Session Type, allowed SSC modes and the default SSC mode, QoS Information, subscribed Session-AMBR, Default 5QI and Default ARP, static IP address/prefix, subscribed User Plane Security Policy, Charging Characteristics to be associated with the PDU Session, and so on.

In addition, UE 308 may request to move a PDU Session between 3GPP and Non 3GPP accesses. The decision to move PDU Sessions between 3GPP access and Non 3GPP access is made on a per PDU Session basis, e.g., UE 308 may, at a given time, have some PDU Sessions using 3GPP access while other PDU Sessions are using Non 3GPP access. UE 308 typically provides a PDU session ID in a PDU Session Establishment Request message. The PDU session ID is unique per UE and represents a unique identifier assigned to a PDU Session. The PDU session ID can be stored in UDM 360 to support handover between 3GPP and non-3GPP access—e.g., when different PLMNs are used for the two accesses.

While many of the above discussed operations may be performed as part of conventional session management processes, this disclosure further describes blockchain session management processes where one or more network entities/NFs of SBA 132 exchange messages with BRB 306 over new blockchain interfaces (e.g., BCy and/or BCz) in order to establish a data session for UE 308. The disclosed blockchain session management processes may complement existing session management processes similar to secondary authentication processes that use an Authentication Authorization, and Accounting (AAA) server in a data network. Here, however, the blockchain enterprise platform (e.g., BRB 306, enterprise blockchain network 304, and BAF(s) 305*a-n*) is natively integrated with and directly exposed to SBA 132. It is also appreciated that the blockchain session management processes, in other embodiments, may replace existing session management processes.

With respect to the blockchain session management processes, SMF 325 receives session request data associated with UE 308. This session request data may be included as part of a PDU Session Establishment Request message, which may comprise the above-mentioned parameters such as the blockchain authentication data. In some embodiments, AMF 320 initially selects SMF 325 based on the session request data and further forwards the session request data to SMF 325 (once selected). SMF 325 selects BRB 306 based on the session request data, and further exchanges at least a portion of the blockchain authentication data (e.g., blockchain authentication credentials associated with UE 308)

with BAF 305 over a blockchain network interface (e.g., BCx and/or BCy, where SMF 325 may route messages through AMF 320, etc.)

In some embodiments, SMF 325 may further select an NEF (e.g., NEF 335—shown in a dashed box in FIG. 3C) to act as an Application Program Interface (API) gateway between SMF 325 and BRB 306. In these embodiments, SMF 325 exchanges authentication data with NEF 335, which in turn exchanges messages with BAF 305 over the blockchain network interface BCx. In other embodiments, SMF 325 may directly communicate with BRB 306 over the blockchain network interface BCx.

SMF 325 receives authentication confirmation data from BAF 305 over the blockchain network interface BCx and establishes a session associated with the UE based on the authentication data.

In some embodiments, SBA 132 may apply a restricted access policy to the session while one or more NFs perform a blockchain credit check/charging event process. In particular, SMF 325 can communicate with PCF 345 to obtain payment credits (e.g., blockchain tokens, etc.) in order to ensure the services to be provided to UE 308 align with its creditworthiness. In turn, PCF 345 can solicit blockchain payment credits from BRB 306 (e.g., either directly and/or indirectly through NEF 335) over the blockchain network interface BCx. PCF 345 and/or SMF 325 can determine that the blockchain payment credits satisfy a payment criteria for one or more network services (e.g., as part of the blockchain charging event), and further remove, modify, and/or update the restricted access policy for the data session.

These and other blockchain enhanced session management features are described in greater detail with respect to the schematic signaling diagrams shown in FIGS. 5A and 5B, below.

Blockchain Registration Process

FIGS. 4A and 4B illustrate respective schematic signaling diagrams 401 and 402 for the disclosed a blockchain registration procedure, where AMF 320 invokes AUSF 355 in diagram 401, and AMF 320 directly authenticates UE 308 with BRB 306 in diagram 402. In general, UEs register with the network in order to receive network services, enable mobility tracking, and support mobility/reachability. Notably, the call flow for the blockchain registration procedures can vary based on initial registrations, mobility registration updates, periodic registration updates, and so on. While signaling diagrams 401 and 402 illustrate an initial registration procedure in accordance with embodiments of the disclosed blockchain registration procedure, it is appreciated the call flows may be modified based the type of UE registration.

Referring to FIG. 4A, schematic signaling diagram 401 begins at step 403, where UE 308 sends a registration request message to RAN/AN 310. In one embodiment, the registration request message can indicate UE 308 supports a blockchain registration procedure using, for example, data fields such as access categories/access identities for existing registration messages (e.g., in accordance with access identities/access categories and RRC establishment clauses specified by 3GPP TS 24.501, table 4.5.6.1 (below)).

| Access identities | Access categories | RRC establishment cause is set to |
|---|---|---|
| 0 | 0 (= MT_acc) | MT access |
|  | 1 (= delay tolerant) | FFS |
|  | 2 (= emergency) | Emergency call |

-continued

| Access identities | Access categories | RRC establishment cause is set to |
|---|---|---|
|  | 3 (= MO_sig) | MO signaling |
|  | 4 (= MO MMTel voice) | MO voice call |
|  | 5 (= MO MMTel video) | FFS |
|  | 6 (= MO SMS and SMSoIP) | FFS |
|  | 7 (= MO_data) | MO data |
| 1 | Any category | "High priority access" |
| 2 | Any category | "High priority access" |
| 11, 15 | Any category | "High priority access" |
| 12, 13, 14, | Any category | "High priority access" |

NOTE:
See subclause 4.5.2, table 4.5.2.1 for use of the access identities of 0, 1, 2, and 11-15.

RAN/AN 310 further selects an AMF—here, AMF 320—based on the registration message. For example, RAN/AN 310 determines the registration request message indicates UE 308 supports the blockchain authentication procedure, and can select an appropriate AMF that likewise supports such procedure. Alternatively, RAN/AN 310 can reject the blockchain authentication request, which causes the UE to revert to existing 3GPP behaviour.

At step 404, RAN/AN 310 sends a registration request message to AMF 320. As mentioned, these registration request messages (and corresponding call flows) may generally follow existing registration procedures such as those specified in 3GPP TS 23.502 (e.g., 4.2.2.2). However, in accordance with the disclosed blockchain authentication procedure, the registration request message may further include a registration type information element (e.g., 5GS registration type information element, defined in 3GPP TS 24.501, 9.8.3.7) that indicates guest access with the additional blockchain mechanisms (e.g., the blockchain authentication procedure).

For example, the 5GS registration type information element is provided below:

| 8 | 7 | 6 | 5 | 4 | 3 | 2 | 1 | |
|---|---|---|---|---|---|---|---|---|
| 5GS registration type IEI | | | | FOR | 5GS registration type value | | | octet 1 |

5GS registration type value (octet 1)
Bits

| 3 | 2 | 1 | |
|---|---|---|---|
| 0 | 0 | 1 | initial registration |
| 0 | 1 | 0 | mobility registration updating |
| 0 | 1 | 1 | periodic registration updating |
| 1 | 1 | 0 | emergency registration |
| 1 | 1 | 1 | reserved |

All other values are unused and shall be interpreted as "Initial registration", if received by the network.
Follow-On Request bit (FOR) (octet 1)
Bit

| 4 | |
|---|---|
| 0 | No follow-on request pending |
| 1 | Follow-on request pending |

In one embodiment, the 5GS registration type information element can enable a follow-on attribute and/or set the follow-on-request bit, which can indicate support or information corresponding to the blockchain authentication procedure. In another embodiment, the 5GS registration type information element can be modified to include a registration type that indicates the guest authenticating mechanism (e.g., the blockchain authentication procedure).

In some embodiments, the blockchain registration procedure, whether indicated in the registration request message with the follow-on request bit or the modified registration type, can include a non-3GPP authentication procedure piggy backed over a Non-Access Stratum (NAS) message. For example, the blockchain authentication procedure could be carried in a transparent container payload of the NAS protocol where the authentication type can be indicated in a NAS payload. Notably, in accordance with network service provider or operator policy/requirements, AMF 320 may first perform standard EAP-AKA procedures (e.g., as defined by 3GPP TS 33.301, 6.1.2 and 6.1.3), and if successful, AMF 320 may further perform the blockchain authentication procedure as a complimentary or supplemental process. However, as mentioned above, in some instances, AMF 320 may perform the blockchain authentication procedure and register/attach UE 308 to the network even if the standard EAP-AKA procedures fail (depending on policy/requirements).

Signaling diagram 401 continues to steps 406 and 408 where UE 308 and AMF 320 exchange identity request/response messages. Here, AMF 320 initiates a UE identity request at step 406 during an initial registration, e.g., when AMF 320 is new to UE 308, and/or when AMF 320 was not provided Subscriber Concealed Identifier (SUCI) information from prior AMF(s) (e.g., in accordance with 3GPP TS 23.502 procedures). As shown, AMF 320 particularly initiates authentication with UE 308 by sending an identity request message at step 406 and, in response, UE 308 generates and transmits, a corresponding identity response (e.g., with a SUCI or privacy preserving identifier containing a concealed subscriber permanent identifier (SUPI)) in step 408.

In some embodiments, UE 308 returns additional parameters at step 408 to indicate support for the blockchain registration procedure (e.g., in addition to or as an alternative to the above discussed indications in 5GS registration type information). After step 408, AMF 320 initiates UE authentication processes with an AUSF and selects AUSF 355 based on, for example, SUCI/SUPI information (described in 3GPP TS 23.501) and/or the indicated support for the blockchain authorization procedure.

Steps 410-425 illustrate the blockchain registration procedure employed by AUSF 355 in conjunction with conventional authentication calls (e.g., as specified by 3GPP TS 33.501) between AMF 320, AUSF 355, and UDM 360. As described herein, the ordering and exchange messages represented by steps 410-425 can reflect various bi-lateral message exchanges.

In particular, step 410 represents an message exchange of challenges/responses between AMF 320 and UE 308, which allow UE 308 to indicate support for the blockchain registration procedure in NAS messages sent to AMF 320 (e.g., over network interface N1).

At step 412, AMF 320 can invoke existing authentication services by sending an authentication request message to AUSF 355. In response, AUSF 355 checks that the requesting AMF in the serving network is entitled to use the serving network and sends, at step 414, a corresponding authentication request message to UDM 360. UDM 360 generates and sends an authentication vector (e.g., security keys, etc.) to AUSF 355, again at step 414.

AUSF 355 also exchanges EAP-Requests/AKA-Challenges with AMF 320, at step 416, which further solicit EAP challenges/responses from UE 308, at step 418. As shown, the EAP challenges/responses between UE 308 and AMF 320 can include NAS messages with blockchain payload data to provide AMF 320 (and thus AUSF 355 at step 416) relevant blockchain authentication information (e.g., UE 308 registration information with prior BRB entities, prior BAF entities, etc.) for subsequent or secondary authentication by BAF 305 (e.g., steps 424-425 discussed below). In accordance with existing authentication protocols, and based on the EAP challenges/responses received by AUSF 355 at step 416, AUSF 355 can complete UE authentication with UDM 360 at step 414.

Collectively, the messages exchanged at steps 410-416 can confirm/accept the UE's credentials or deny/reject the UE's credentials based on existing authentication protocols. In addition, these messages can provide appropriate security context/acknowledgements between UE 308, AMF 320, AUSF 355, and UDM 360, which protect/encrypt subsequent messages from UE 308.

Regardless of success/failure of UE authentication in steps 410, AMF 320 and AUSF 355 may further perform the blockchain registration procedure (e.g., as a complimentary/substitute authentication procedure). In this fashion, the blockchain authentication procedure can thought of as an extension to existing calls and/or may include additional flags/parameters in appropriate messages.

Depending on policies and/or security requirements, AMF 320 may continue on to perform the blockchain authentication process with AUSF 355. As mentioned above, AMF 320 can receive relevant blockchain authentication information from UE 308 in the course of exchanging authentication messages based on existing procedures, or alternatively, UE 308 can send separate NAS messages to AMF 320 with the blockchain authentication information included in payload data, such as shown at step 420. The blockchain authentication information is used by AMF 320/AUSF 355 to authenticate UE 308 with BRB 306 and thus, BAF 305. For example, the blockchain authentication information can include a blockchain entity ID that corresponds to BRB 306 and/or BAF 305 as well as blockchain credentials, such as blockchain registration information, blockchain subscription information, and so on. Preferably, UE 308 registers and subscribes to BRB 306 and/or BAF 305 (e.g., over blockchain network interface BCz) to obtain the appropriate blockchain authentication information. AMF 320 receives these NAS messages, and sends corresponding blockchain authentication messages to BRB 306. BRB 306 identifies the blockchain entity ID from the authentication messages, and selects an appropriate BAF (here, BAF 305) to authenticate UE 308.

At step 422, AMF 320 further invokes AUSF 355 to continue the blockchain authentication procedure and authenticate UE 308 with BRB 306 using, for example, an API message (e.g., a Nausf service call over the N12 network interface). In this fashion, AMF 320 sends service-based API messages (e.g., as defined by 3GPP TS 29.509 and TS 29.518) with appropriate blockchain authentication flags/parameters/payload/etc. to AUSF 355.

AUSF 355 receives the API messages and exchanges, at step 424, blockchain authentication messages with BRB 306 over blockchain network interface BCx, which further causes BRB 306 to authenticate UE 308 with BAF 305 (e.g., based on the authentication data associated with UE 308). In this fashion, BRB 306 authenticates UE 308 with BAF 305 at step 425, and may receive a blockchain authentication confirmation message from BAF 305. BRB 306 sends the confirmation message to AUSF 355, which further sends the blockchain authentication confirmation messages to AMF 320, as shown by the bi-lateral signals at steps 424 and 422.

It is appreciated the blockchain authentication procedure may require additional messages to handle situations where BRB 306 is slow to respond, BAF 305 is unavailable or out of service, and/or fails to confirm the UE credentials. In these situations, AMF 320 may send temporary Ack messages to UE 308 to provide additional processing time for BRB 306 and/or BAF 305 to authenticate the UE credentials.

Steps 420-425 represent blockchain authentication operations where AMF 320 exchanges blockchain authentication data associated with UE 308 with BRB 306, BRB 306 receives the blockchain authentication data and selects BAF 305 (e.g., based on a blockchain account identifier, UE blockchain credentials, etc.), and BRB 306 completes the blockchain authentication transaction with BAF 305. In some embodiments, BAF 305 may be considered an agent of UE 308 and UE 308 can previously register and/or subscribe to BAF 305 over blockchain interface BCz (e.g., which can initially generate the blockchain authentication data associated with UE 308).

Once UE 308 is successfully authenticated with the blockchain registration procedure, signaling diagram continues to steps 430, 432, 436, and 438, which include appropriate messages to complete UE 308 registration in accordance with 3GPP TS 23.502 (e.g., UDM selection/update, PCF selection, registration acceptance, and so on).

In some embodiments of this disclosure, the blockchain authentication procedure may also include an optional credit check for UE 308, shown as a charging event at steps 434-435. Notably, this credit check represents a charging authorization procedure that can be performed after UE 308 is authenticated with BRB 306/BAF 305 but before AMF 320 attaches UE 308 to the SBA network.

In operation, PCF 345 manages mobility credentials for UE 308 and performs the credit authorization procedure with BRB 306, which further communicates with BAF 305 in an authorization layer. The credit authorization procedure determines if UE 308 (and its corresponding user) can complete a transaction (e.g., can the user pay for the transaction now or at a future time), the type and/or number of network services the user can afford (e.g., which can limit or restrict access to network resources), and so on. For example, in an Internet of Things (IoT) context, PCF 345 can use the credit authorization procedure to determine virtual contract information (e.g., credit worthiness) associated with UE 308, which can be shared with other network entities/services (e.g., NFs) in SBA 132.

As mentioned above, steps 430, 432, 436, and 438 include messages to complete UE 308 registration in accordance with 3GPP TS 23.502.

FIG. 4B provides signaling diagram 402, which shows AMF 320 directly performing the blockchain registration procedure with BRB 306. Signaling diagram 402 includes many of the same steps or calls shown in signaling diagram 401, which are discussed above.

In this embodiment, AMF 320 directly perform the blockchain registration procedure with BRB 306 after, for example, AMF 320 successfully obtains an appropriate security context/acknowledgements from AUSF 355/UDM 360, which ensures encryption/integrity protection for messages exchanged with UE 308.

In addition to the steps shown in signaling diagram 401, signaling diagram 402 further provides steps 426, 428, and 429, which represent messages directly exchanged between AMF 320 and BRB 306 and between BRB 306 and BAF 305.

In particular, at step 426, UE 308 exchanges blockchain authentication data with AMF 320 using, for example, NAS messages that can include blockchain payload data. In some embodiments, AMF 320 can select BRB 306 based on the blockchain authentication data, while in other embodiments, AMF 320 may be assigned to BRB 306 by default.

AMF 320 sends the authentication data to BRB 306 at step 428. As mentioned, the blockchain authentication data can include a blockchain entity ID that corresponds to BAF 305 as well as blockchain credentials (e.g., registration information, subscription information, account information, etc.) that corresponds to UE 308. BRB 306 receives the blockchain authentication data and can select an appropriate BAF (here, BAF 305) based on the blockchain entity ID. BRB 306 further authenticates UE 308 with BAF 305 at step 429, and upon successful authentication, BAF 305 sends an authentication confirmation to BRB 306. BRB 306 further sends the authentication confirmation to AMF 320 at step 428 (which represents a bi-lateral message exchange).

Steps 430, 432, 436, and 438 represent messages for completing UE registration in accordance with 3GPP TS 23.502.

Figure 5A:
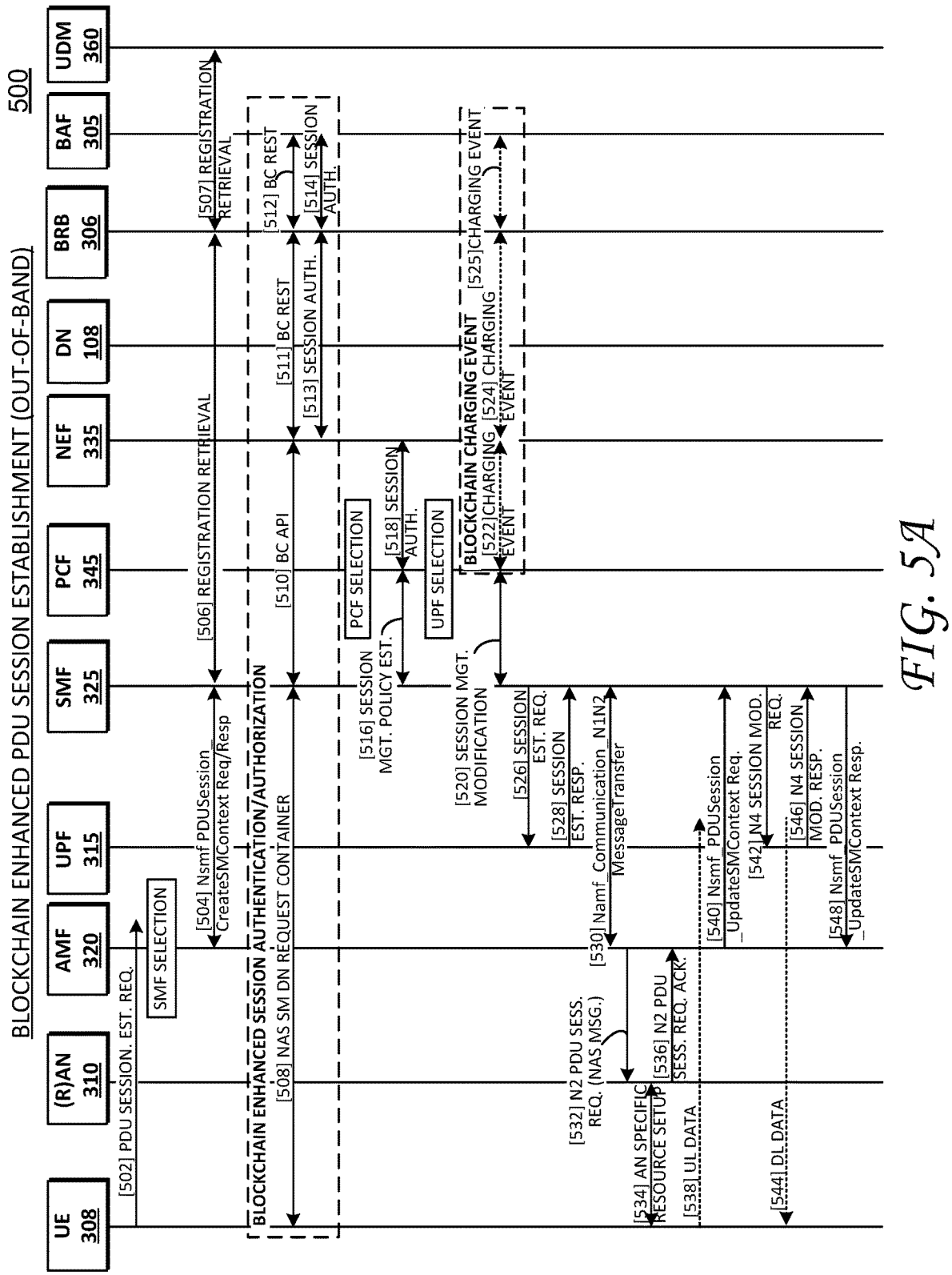
FIG. 5A illustrates a schematic signalling diagram, showing callflows for an out-of-band blockchain session establishment procedure.
Figure 5B:
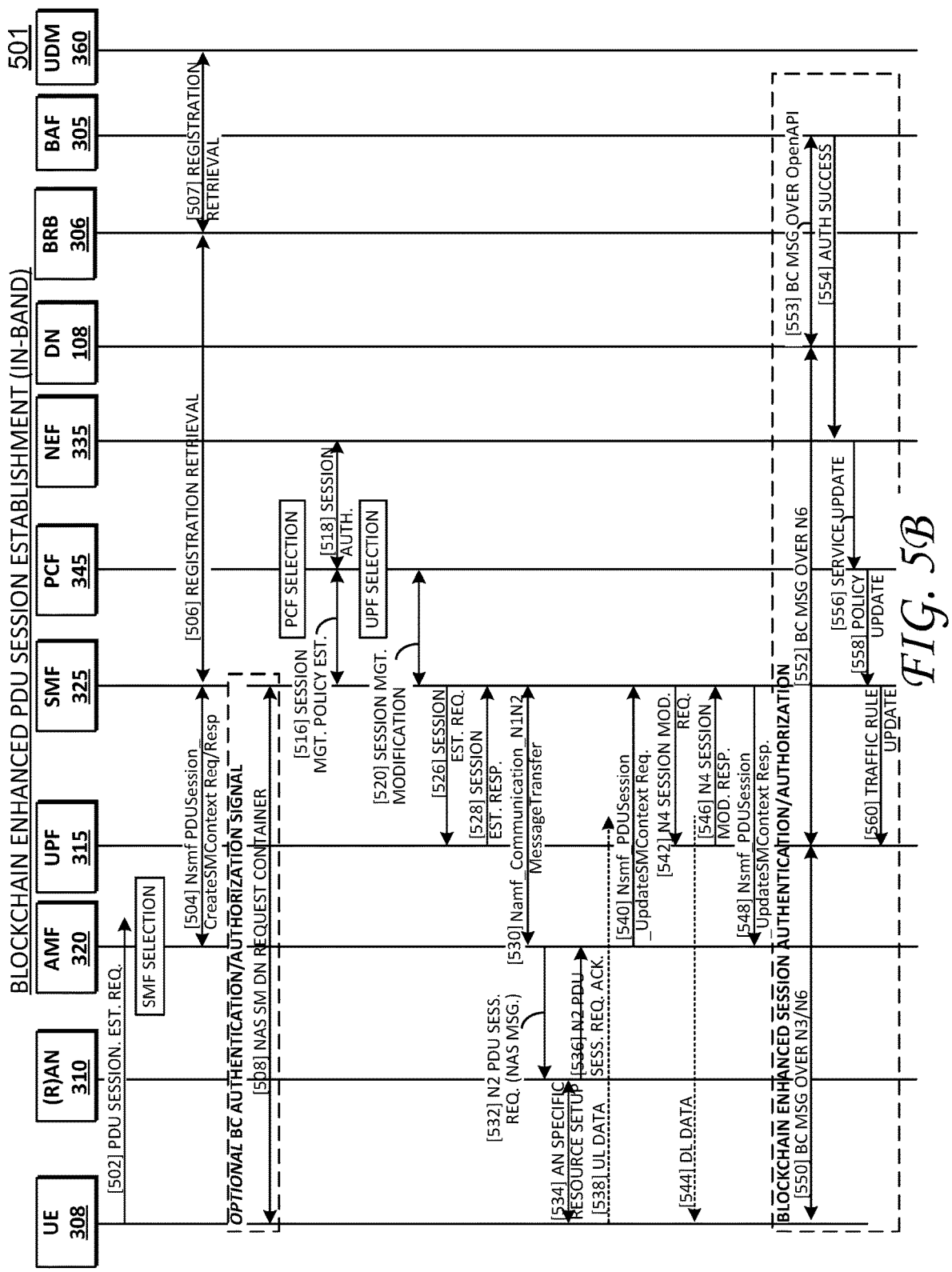
FIG. 5B illustrates a schematic signalling diagram, showing callflows for an in-band blockchain session establishment procedure.

Blockchain Enhanced PDN Session Establishment with Out-of-Band Blockchain Authorization FIGS. 5A and 5B illustrate respective schematic signaling diagrams 500 and 501 of the disclosed blockchain enhanced session management processes using a natively integrated blockchain platform. Although the schematic signaling diagrams illustrate an initial session establishment procedure for a PDU session, it is appreciated the call flows may be readily modified according to handover operations, switching sessions, requesting sessions for emergency services, and the like.

FIG. 5A particularly illustrates schematic signaling diagram 500 showing call flows for a blockchain enhanced PDU session establishment with an out-of-band authorization operations. In general, the illustrated blockchain session establishment procedure leverages a new blockchain network interface (BCy) to authenticate UE 308 for network services and incorporates NEF 335 to act as an API gateway between SMF 325 and BRB 306. In addition, FIG. 5A also illustrates blockchain charging events (e.g., steps 522, 524, and 525) between PCF 345, BRB 306, and BAF 305, which operably provide funds (e.g., tokens from an eWallet or blockchain wallet) directly for one or more network services.

As shown, at step 502, UE 308 initiates an initial PDU (or PDN) session establishment request and sends session request data (e.g., Non-Access Stratum (NAS) messages) to AMF 320 over network interface N1. The NAS messages can include information such as Single Network Slice Selection Assistance Information (S-NSSAI), Data Network Name (DNN), PDU session IDs, request types, old PDU session IDs, an N1 Service Management (SM) container, indications/requests for blockchain authorization (e.g., as a secondary authorization), and so on.

Notably, the indications/requests for the blockchain authorization can represent a preference by UE 308 for the network (SBA 132) to use blockchain authentication data (e.g., blockchain credentials) to authorize/authenticate UE 308 for a PDU session. In one embodiment, the indication of the blockchain authorization may be specified by the S-NSSAI data, which can include a unique identifier of a network slice. For example, the S-NSSAI data can include a Slice/

Service type (SST), denoting expected network behaviour, as well as a Slice Differentiator (SD), differentiating amongst multiple network slices of the same Slice/Service type. Here, UE 308 can provide S-NSSAI data having a particular unique identifier corresponding to blockchain capable network slice.

Alternatively, the indication of the blockchain authorization may be included as one of the SST values in the S-NSSAI data in accordance with 3GPP TS 23.501 (clause 5.15, table 5.15.2.2-1). For example, the SST value may be modified to include the blockchain ID as provided below.

| Slice/Service type | SST value | Characteristics. |
|---|---|---|
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |
| Blockchain | X | Slice that uses blockchain for authorization and/or service provisioning. |

In other embodiments, if slicing is orthogonal to the blockchain procedures, the PDU "Request Type" could be set to "guest access with dual authentication", as is appreciated by those skilled in the art.

AMF 320 receives the session establishment request and further discovers/selects an appropriate SMF—here, SMF 325. In particular, AMF 320 discovers and selects SMF 325 based on parameters included in the initial PDU session request (e.g., step 502). As mentioned, these parameters include S-NSSAI data, DNN data, UE subscriptions, local operator policies, blockchain authentication data/blockchain capabilities, and so on.

Here, AMF 320 selects SMF 325 based, at least in part, on its blockchain session capabilities. If AMF 320 does not have an association with an SMF for the PDU session ID (e.g., when Request Type indicates "initial request"), AMF 320 invokes a PDU session creation request (e.g., Nsmf_PDUSession_CreateSMContext Request), as shown at step 504. However, if AMF 320 already has an association with an SMF for the PDU Session ID (e.g., when Request Type indicates "existing PDU Session"), the AMF invokes the Nsmf_PDUSession_UpdateSMContext Request. Notably, the PDU Session creation request can specify a request type set to "guest access with dual authentication" (e.g., if a slice is not explicitly set for blockchain authorization).

At steps 506 and 507, SMF 325 exchanges registration/subscription information (e.g., associated with UE 308) with UDM 360 through BRB 306. Again, at step 504, SMF 325 sends a corresponding PDU session SM context responses (e.g., an SM context identifier) to AMF 320. In this fashion, SMF 325 registers itself for an initial PDU session with UDM 360, in accordance with UE-requested PDU Session Establishment procedures provided by 3GPP TS 23.502.

Steps 508-514 represent operations of the disclosed blockchain session management, including out-of-band blockchain authorization/authentication operations as part of the PDN session establishment. These blockchain authorization/authentication operations may conform to secondary authentication/authorization operations such as Data Network (DN)-Authentication, Authorization, and Accounting (AAA) server, described by 3GPP TS 23.501, clause 5.6.6. As shown, the blockchain authorization/authentication operations further leverage the natively integrated blockchain platform (e.g., BRB 306 and/or BAF 305) which is exposed to SBA 132 over a new blockchain network interfaces BCy and/or BCx.

In particular, at step 508, UE 308 sends a NAS SM DN Request Container message to SMF 325 to request the blockchain authentication procedure as a secondary authorization for the PDN session (e.g., in accordance with secondary authorization request of 3GPP TS 23.501, clause 5.6.6). The NAS SM DN Request Container message includes blockchain information for PDU session authorization by an external Data Network (e.g., slice information (identified by S-NSSAI), PDU session ID, a PDN it would like to connect to (identified by DNN), a blockchain server ID (identifying BAF 305), etc.). This blockchain information may be provided as part of payload data, and/or may be included as part of follow-on request data.

Although the NAS SM DN Request Container message is illustrated as a single signal between UE 308 and SMF 325, it is appreciated this signal may be conveyed to SMF 325 by AMF 320. For example, UE 308 can send the signal to AMF 320 over the N1 network interface, and AMF 320 can send or forward the signal (or appropriate portions of the signal) to SMF 325 over the N11 network interface. In some embodiments, the NAS SM DN Request Container can include the PDU session establishment request message (e.g., step 502) as part of a N1 SM container, as is appreciated by those skilled in the art.

SMF 325 receives the NAS SM DN Request Container, and determines an appropriate BRB entity and/or appropriate BAF entity (e.g., a blockchain server) based on the blockchain information and local configuration information contained therein. For example, SMF 325 can determine BRB 306 is as the appropriate blockchain roaming broker and further exchange blockchain Application Programming Interface (API) messages with BRB 306 over a blockchain network interface (e.g., the BCx network interface).

At step 510, SMF 325 exchanges the blockchain API messages with BRB 306, using NEF 335, which acts as a gateway between SMF 325 and BRB 306. NEF 335 further exchanges, at steps 511-513, corresponding Representational State Transfer (REST) API messages with BRB 306. In this fashion, NEF 335 allows external users (e.g., enterprises/partner operations) to monitor, provision, and enforce application-level policy for users inside the operator network. In addition, just as NEF 335 can act as a gateway between SMF 325 and BRB 306, BRB 306 can act as a gateway between NEF 335 (and/or other NFs) and BAF 305.

Steps 511-514 continue until successful authorization or failure. At step 514, BAF 305 sends BRB 306 authentication confirmation data (e.g., indicating successful session authorization and profile information), which is further sent to NEF 335 at step 513, which further forwards the authentication confimration data to SMF 325 at step 510.

Notably, the authentication confirmation data can include a service name that BAF 305 uses to register available network services for UE 308. In addition, BAF 305 may provide service specific attributes (e.g., application access capabilities, QoS and Data rate profiles and other applications that the user has subscribed to as part of the blockchain contract, etc.) Notably, if authorization fails, the PDU set up request is rejected with appropriate cause code.

After successful authorization, SMF 325 continues with PDU establishment operations and, based on a PDU profile, selects a PCF and performs Session Management Policy Establishment procedure, as shown at step 516. SMF 325 can provide a blockchain flag and associated parameters (if available from UE 308) to indicate to PCF 345 that service capabilities can be obtained from BAF 305 (e.g., and/or via NEF 335). For example, PCF 345 can use the blockchain authentication data (received from SMF 325 at step 516) to identify NEF 335 and/or BAF 305.

PCF 345 requests, at step 518, service parameters from NEF 335, which further obtains the service parameters from BAF 305. Notably, step 518 may be optional, because PCF 345 can use the UDR as per 4.16.4 procedure defined in 3GPP TS 23.502. However, in some instances, the UDR may not have a service profile for all use cases (e.g., where the UE is a guest on the service provider's network). As shown here, PCF 345 retrieves the service profile from NEF 335 (which NEF 335 retrieves from BAF 305). PCF 345 further determines the network services, QoS, and charging plan to be applied to the PDU session associated with UE 308.

SMF 325 further selects a UPF (e.g., UPF 315) to serve the PDU session, and at steps 520-524, SMF 325 performs a blockchain charging event in conjunction with PCF 345, NEF 335, and/or BAF 305, based on the profile information received at step 514.

In particular, SMF 325 requests PCF 345 and NEF 335 to perform the blockchain charging event, which can represent a credit request transaction. The blockchain charging event includes operations for BAF 305 to return blockchain payment credits (e.g., blockchain tokens) to PCF 345 and/or SMF 325 (e.g., through BRB 306) in order to pay for one or more network services for UE 308. For example, the BAF 305 can return blockchain tokens from a blockchain eWallet associated with UE 308.

In some instances, SMF 325 and PCF 345 can return tokens to BAF 305, again through BRB 306, should all the tokens requested in this step not be consumed. In comparison to other pre-paid services that use quotas from an Online Charging Server (OCS) (not an actual monetary fund), the blockchain charging event represents a prepaid transaction that can include actual funds, which the service provider can return if the contract is not completed in an authorized time period.

The blockchain charging event may include messages exchanged over the N30 network interface, shown at step 522, between PCF 345 and NEF 335. In this fashion, Nnef API messages may be augmented to include appropriate blockchain eWallet messages (requests/returns/etc.)

Steps 524-525 represent trusted communications between NEF 335, BRB 306, and BAF 305 since BAF 305 is a trusted application. However, in some instances, BAF 305 may not be trusted, in which case an Application Function (AF) could provide a proxy for these procedures.

In one or more additional embodiments, enhanced blockchain session management operations also accommodate delayed authorization. For example, BAF 305 and/or BRB 306 may require a certain amount of time to conclude a consensus, which may delay its response/fund verifications (e.g., as part of the blockchain charging event). In these instances, SMF 325 can request PCF 345 to notify it when NEF 335 allows the subscription. In addition, SMF 325 concludes the PDU session establishment, but can indicate UPF 315 to place the PDU session in quarantine until further notice (e.g., until BAF 305 concludes the consensus/completes the charging event).

Remaining steps 526-548, may be defined by 3GPP TS 23.502, as is appreciated by those skilled in the art.

Blockchain Enhanced PDN Session Establishment with In-Band Blockchain Authorization FIG. 5B illustrates a schematic signaling diagram 501, showing call flows for a blockchain enhanced PDU session establishment with in-band authorization operations. The in-band blockchain session establishment procedure of FIG. 5B particularly leverages blockchain messages between UE 308 and BAF 305 (and/or through DN 108) using Internet Protocol (IP) datagram encapsulation, as discussed in greater detail below.

Signaling diagram 501 begins at step 502 where, as discussed above, UE 308 initiates a PDU session establishment request. The session establishment call flow follows the above-discussed operations for steps 504, 506, and 507.

At step 508, UE 308 sends a NAS SM DN Request Container message to SMF 325 to request the blockchain authentication procedure as a secondary authorization for the PDN session. As mentioned, the NAS SM DN Request Container message includes blockchain information for PDU session authorization by an external Data Network (e.g., slice information (identified by S-NSSAI), PDU session ID, a PDN it would like to connect to (identified by DNN), a blockchain server ID (identifying BAF 305), etc.) Notably, step 508 represents an optional signal between UE 308 and SMF 325. However, even though it is optional, step 508 helps build trust between the core network (e.g., SBA 132) and BAF 305 (e.g., a Distributed Ledger Technology (DLT) entity). For example, as discussed in greater detail below, until the blockchain authentication procedure results in successful authorization of the UE, UE 308 may only have a temporary connection and the access control list may be restricted. BAF 305 is typically registered and authenticated with NEF 335, and SMF 325 may invoke NEF 335 to pass on the blockchain authentication credentials. Once authorized, UE 308 is notified of successful authorization, and BAF 305 notifies NEF 335, which (in turn) notifies SMF 325 of the successful authorization.

Steps 510-514 (not shown) apply for the out-of-band blockchain authentication operations (e.g., secondary authentication/authorization operations), and are illustrated in signaling diagram 500. Here, signaling diagram 501 illustrates in-band authentication operations, which are performed later in the signal flow (e.g., steps 550-560), as described below.

In proper context, UE 308 is attached to the network at step 508, but does not have an IP address assigned. After step 508, SMF 325 selects PCF 345 based on a PDU profile. PCF 345 performs the Session Management Policy Establishment procedure, shown by steps 516-518. For example, the Session Management Policy Establishment procedure can include operations where SMF 325 establishes the PDU Session with PCF 345, including SMF 325 receiving default PCC Rules for the PDU Session, PCF 345 subscribing to IP allocation/release events in SMF 325, PCF 345 updating policy information in SMF 325, and so on.

Following steps 516-518, SMF 325 selects a UPF (e.g., UPF 315) to serve the PDU session. In case of PDU Type IPv4 or IPv6, SMF 325 allocates an IP address/prefix for the PDU Session as described in 3GPP TS 23.501, clause 5.8.1. In case of a PDU Type IPv6, SMF 325 can allocate an interface identifier to UE 308 for the UE to build its link-local address. For Unstructured PDU Type the SMF may allocate an IPv6 prefix for the PDU Session and N6 point-to-point tunnelling (based on UDP/IPv6) as described in 3GPP TS 23.501, clause 5.6.10.3.

Step 520 is modified since the above-discussed out-of-band blockchain authentication operations do not occur (e.g., steps 510-514) here. Instead, at step 520, PCF 345 determines UE 308 requests the blockchain authentication/authorization procedure. For example, SMF 325 can provide a blockchain indication to PCF 345, which blockchain indication can include a blockchain flag, blockchain authentication data, payment data, blockchain entity identifiers, and so on. Here, the blockchain indication includes a blockchain flag, which causes PCF 345 to apply a restricted or guest access policy for the PDU session, pending successful in-band blockchain authorization/authentication operations, discussed below. Put differently, PCF 345 installs a restricted access rule for the PDU session, which may be similar to the rules applied for pre-paid users (e.g., users can access a Domain Name Server (DNS) to resolve the servers and HTTPS port/destination pair to a set of servers, etc.) In some embodiments, the server IP addresses could be returned in step 522 and step 524 as part of a blockchain charging event (not shown here).

If there is a commercial agreement in place, the restricted access policy allows UE 308 access to DN 108 to obtain authentication/authorization and blockchain payment data/ tokens from BAF 305. Again, similar to the pre-paid restricted policies, which allows UE 308 to connect to DN 108 through a web portal and enter credit card information, the in-band blockchain authentication/authorization operations represented by steps 550-562 leverage the native blockchain platform to automatically debit blockchain payments/tokens from BAF 305. In this fashion, the subscriber associated with UE 308 only needs to ensure their wallet has funds.

Following step 520, SMF 325 provisions rules on UPF 315, at steps 526-528, to allow DNS requests and REST messages to BAF 305 (e.g., a DLT server address provided by PCF 345).

Steps 530-548 represent signals or messages accordance with UE-requested PDU Session Establishment procedures provided by 3GPP TS 23.502.

Steps 550-560 represent in-band blockchain authentication/authorization signals or messages. While steps 550-560 are illustrated after the PDU session is established at step 548 with a restricted access policy, it is appreciated these signals or messages may begin at step 538 (Up Link (UL) traffic).

At step 550, UE 308 sends blockchain authentication data to UPF 315 using IP datagram encapsulation. UPF 315 acts as a gateway to BAF 305 and sends, at step 552, corresponding blockchain data to BAF 305. In some embodiments, UPF 315 may send messages to other NFs (e.g., SMF 325) and/or over DN 108 for forwarding to BAF 305. However, for sake of simplicity, signaling diagram 501 shows UPF 315 sending the corresponding blockchain data directly to BAF 305. The blockchain authentication data can include, for example, blockchain authentication credentials, blockchain entity identifiers (e.g., corresponding to BAF 305), and other information required by BAF 305 to authenticate/authorize UE 308 as well as to solicit blockchain payment data (e.g., blockchain tokens).

In this fashion, DN 108 may treat the PDU session as a prepaid session and allow approved protocols. In some embodiments, the PDU session may be associated with a timer that can safeguard the session and terminate the session if the PDU authentication/authorization does not conclude within a predetermined timeframe. In these embodiments, UDM 360 can set the timeframe at step 506 and/or the timeframe may be locally configured as part of an APN profile.

Steps 550-553 represent bi-directional messages between UE 308, UPF 315, BRB 306, and BAF 305. Other NFs (e.g., NEF 335, DN 108, etc.) may be invoked or employed as is appreciated by those skilled in the art. The bi-directional messages include blockchain authentication data required by BAF 305 to authenticate/authorize UE 308 as well as to solicit blockchain payment data (e.g., blockchain tokens). If authorization fails at steps 550-553, UE 308 can choose to disconnect from the network. The network (e.g., SBA 132) would be notified at steps 556-558, and may further block UE 308, disconnect the PDU session, or try authentication again.

BAF 305 authenticates (e.g., verifies blockchain credentials for UE 308) the blockchain credentials associated with UE 308 and, if successful, it notifies NEF 335 (step 554), which in turn notifies PCF 345 (step 556) regarding successful authentication. Notably, BRB 306 may act as a gateway to facilitate communications between NEF 335 and BAF 305. In addition, BAF 305 can return blockchain payment data (e.g., blockchain tokens) to NEF 335 and/or PCF 345. PCF 345 updates the policy/traffic rules for SMF 325, at step 558, which further updates the traffic rules with UPF 315. The updated policy/traffic rules permit UE 308 access to contracted network services (e.g., as specified and/or as paid for by BAF 305).

The call flows or messages shown in FIG. 5B illustrate an in-band blockchain enhanced PDU session establishment procedure where BAF 305 authenticates UE 308 and returns blockchain payment data (e.g., blockchain tokens) to appropriate NFs in SBA 132 using IP datagram encapsulation.

Figure 6:
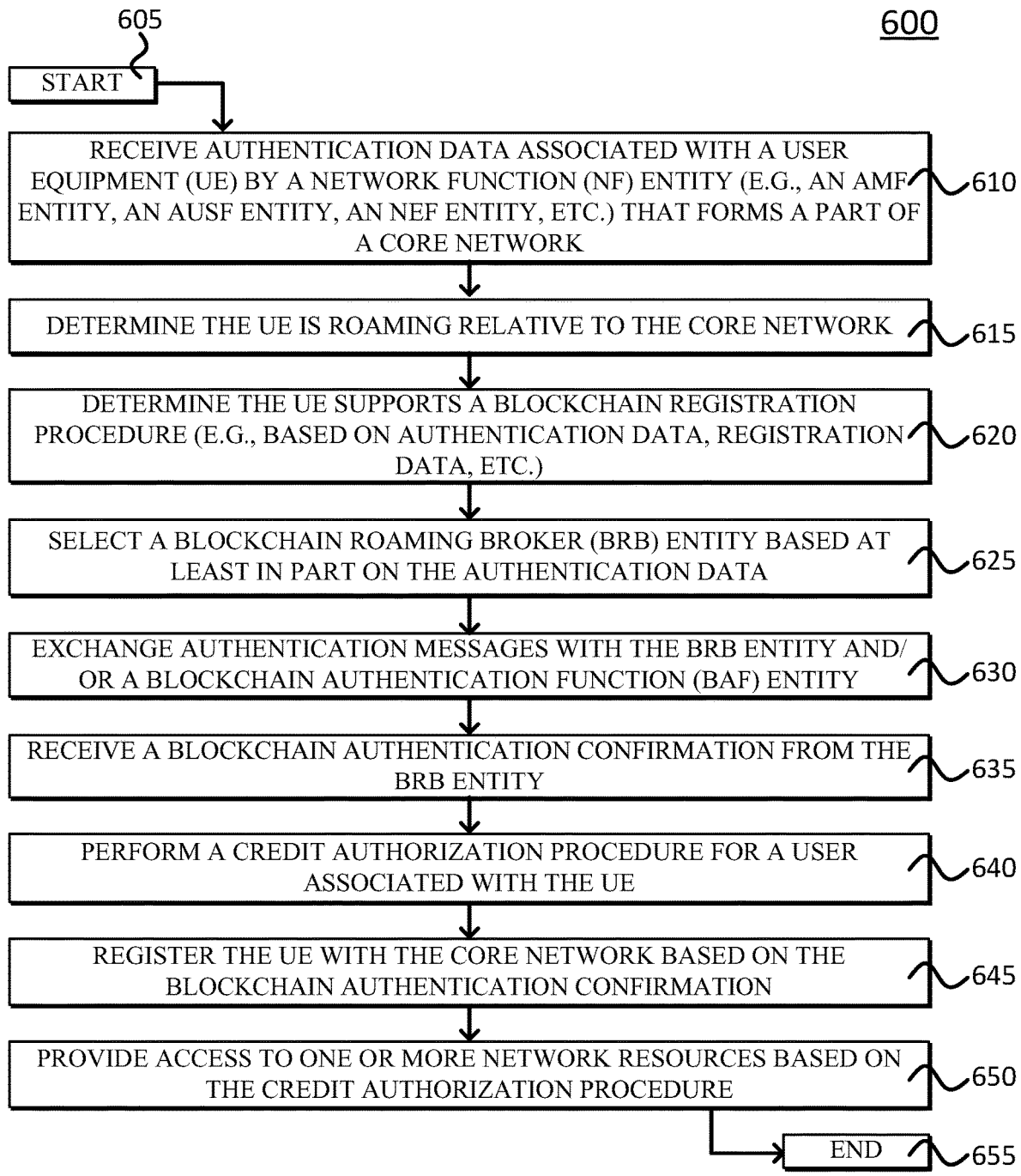
FIG. 6 illustrates an example simplified procedure for registering User Equipment (UE) in a communication network, in accordance with one or more embodiments of the blockchain registration procedure.

FIG. 6 illustrates an example simplified procedure 600 for registering User Equipment (UE) in accordance with one or more embodiments of the blockchain registration procedure. For example, procedure 600 can represent operations performed by a NF entity (e.g., AMF 320, AUSF 355, NEF 335, etc.) as part of the 5G core network.

Procedure 600 begins at step 605 and continues on to step 610 where, as discussed above, a core NF entity receives authentication data associated with a User Equipment (UE). The NF entity further determines the UE is roaming relative to the core network at step 615 and also determines the UE supports a blockchain registration procedure at step 620. At step 625, the NF entity can select a Blockchain Roaming Broker (BRB—e.g., BRB 306) and exchange, at step 630, authentication messages with the BRB entity. The BRB entity typically acts as an agent of a Blockchain Authentication Function (BAF) entity. In this fashion, the BRB entity can receive the authentication messages (which can include authentication data) and authenticate the UE with the BAF entity. The BRB entity can further send corresponding blockchain authentication confimration messages from the BAF to the NF, as illustrated in step 635.

In addition, in some embodiments, the NF can perform a credit authorization procedure for a user associated with the UE, as shown at step 640. For example, the NF can include a PCF entity, which can communicate with the BRB entity and/or the BAF entity to determine if the user has appropriate funds (e.g., in an eWallet or a blockchain account) to pay for requested network services.

At step 645, the NF entity registers the UE with the core network based on the blockchain authentication confirmation (e.g., received from the BRB entity), and at step 650, the NF entity provides access to one or more network resources based on the credit authorization procedure.

Procedure 600 subsequently ends at step 655, but may return again to step 510 where the NF receives authentication for another UE.

It should be noted that while certain steps within procedure 600 may be optional, the steps shown in FIG. 6 are merely example steps for illustration—certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a native blockchain platform for wireless networks. This native blockchain platform supports new use cases that create opportunities to share network resources across multiple provider networks, increase workload mobility security, improve billing/mediation and reconciliation and create mechanisms for roaming authentication/registration using blockchain technology. In addition, the native blockchain platform provides new opportunities for the app economy and creates a new market place for Mobile virtual network operators (MVNO) participation. As discussed above the native blockchain platform facilitates new methods for authenticating UE when attaching the UE to the network as well as new methods to facilitate payments for network services as part of blockchain charging events.

While there have been shown and described illustrative embodiments of the native blockchain platform and corresponding operations in a specific network context (e.g., a mobile core network for a 5G network), it is to be understood that various other adaptations and modifications may be made within the spirit and scope of the embodiments herein. For example, the embodiments and operations disclosed herein have been described with respect to certain devices, NFs, interfaces, and systems, however it is appreciated that such embodiments are provided for purposes of example, not limitation and that the blockchain authentication techniques disclosed herein can be incorporated as part of existing wireless networks.

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
exchanging authentication messages over a blockchain network interface with a Blockchain Roaming Broker (BRB) entity to cause the BRB entity to authenticate blockchain credentials associated with user equipment at a Blockchain Authentication Function (BAF) entity;
receiving an authentication confirmation from the BRB entity; and
registering the user equipment with a network based on the authentication confirmation.

2. The method of claim 1, further comprising:
determining the user equipment is roaming relative to the network based at least in part on authentication data associated with the user equipment.

3. The method of claim 2, further comprising:
selecting the BRB entity based at least in part on the authentication data.

4. The method of claim 1, further comprising:
receiving authentication data associated with the user equipment by a Network Function (NF) entity that forms a part of a core network,
wherein the NF entity includes at least one of an Access and Mobility Management Function (AMF) entity, an Authentication Server Function (AUSF) entity, or a Network Exposure Function (NEF) entity.

5. The method of claim 1, further comprising:
receiving authentication data associated with the user equipment by a Network Function (NF) entity that forms a part of a core network,
wherein,
the NF entity is a first NF entity, and
the exchanging of the authentication messages includes invoking, by the first NF entity, a second NF entity to exchange authentication messages between the first NF entity and the BRB entity.

6. The method of claim 1, further comprising:
receiving authentication data associated with the user equipment by a Network Function (NF) entity that forms a part of a core network; and
receiving, by the NF entity, blockchain credentials in a Non-Access Stratum (NAS) message from the user equipment,
wherein the exchanging of the authentication messages includes exchanging the blockchain credentials between the NF entity and the BRB entity.

7. The method of claim 6, wherein the blockchain network interface is a first blockchain network interface, wherein the user equipment receives the blockchain credentials from a BAF entity over a second blockchain network interface independent of the network.

8. The method of claim 1, further comprising:
performing a credit authorization procedure for a user associated with the user equipment; and providing the user equipment access to one or more network resources based on the credit authorization procedure.

9. The method of claim 8, wherein the performing of the credit authorization procedure includes invoking a Policy Control Function (PCF) entity to perform the credit authorization procedure.

10. The method of claim 1, further comprising:
determining the user equipment supports a blockchain registration procedure;
receiving, by a Network Function (NF) entity, authentication data as part of a registration request message associated with the user equipment over at least one of a Radio Access Network (RAN) interface or an Access Network (AN) interface; and
determining the registration request message indicates the user equipment supports blockchain authentication in an access category.

11. The method of claim 1, wherein the exchanging of the authentication messages includes exchanging one or more REST Application Program Interface (API) messages between a Network Function (NF) entity and the BRB entity.

12. A network function device comprising:
one or more network interfaces to communicate within a communication network;
a processor coupled to the network interfaces and adapted to execute one or more processes; and
a memory configured to store instructions executable by the processor, wherein the instructions, when executed, are operable to:
exchange authentication messages over a blockchain network interface with a Blockchain Roaming Broker (BRB) entity to cause the BRB entity to authenticate blockchain credentials associated with user equipment at a Blockchain Authentication Function (BAF);
receive an authentication confirmation from the BRB entity; and
register the user equipment with at least a portion of a network based on the authentication confirmation.

13. The device of claim 12, wherein the instructions, when executed, are further operable to:
determine the user equipment is roaming relative to the network based at least in part on authentication data associated with the user equipment.

14. The device of claim 13, wherein the instructions, when executed, are further operable to:
select the BRB entity based at least in part on the authentication data.

15. The device of claim 12, wherein the NF device includes at least one of an Access and Mobility Management Function (AMF) entity, an Authentication Server Function (AUSF) entity, or a Network Exposure Function (NEF) entity.

16. A tangible, non-transitory, computer-readable media having instructions encoded thereon, the instructions, when executed by a processor, are operable to:
exchange authentication messages over a blockchain network interface with a Blockchain Roaming Broker (BRB) entity to cause the BRB entity to authenticate blockchain credentials associated with user equipment at a Blockchain Authentication Function (BAF);
receive an authentication confirmation from the BRB entity; and
register the user equipment with at least a portion of a network based on the authentication confirmation.

17. The tangible, non-transitory, computer-readable media of claim 16, wherein the instructions, when executed by the processor are further operable to:
select the BRB entity based at least in part on authentication data associated with the user equipment.

18. The tangible, non-transitory, computer-readable media of claim 16, wherein the instructions, when executed by the processor, are further operable to:
perform a credit authorization procedure for a user associated with the user equipment; and
provide the user equipment access to one or more network resources based on the credit authorization procedure.

* * * * *